(12) United States Patent
Kuroda

(10) Patent No.: US 7,706,241 B2
(45) Date of Patent: Apr. 27, 2010

(54) INFORMATION RECORDING MEDIUM, INFORMATION RECORDING DEVICE AND METHOD, AND COMPUTER PROGRAM

(75) Inventor: Kazuo Kuroda, Saitama (JP)

(73) Assignee: Pioneer Corporation, Tokyo (JP)

( * ) Notice: Subject to any disclaimer, the term of this patent is extended or adjusted under 35 U.S.C. 154(b) by 686 days.

(21) Appl. No.: 11/628,757

(22) PCT Filed: Jun. 10, 2005

(86) PCT No.: PCT/JP2005/010678

§ 371 (c)(1),
(2), (4) Date: Feb. 13, 2007

(87) PCT Pub. No.: WO2005/122152

PCT Pub. Date: Dec. 22, 2005

(65) Prior Publication Data

US 2008/0049578 A1 Feb. 28, 2008

(30) Foreign Application Priority Data

Jun. 11, 2004 (JP) .............................. 2004-173630

(51) Int. Cl.
*G11B 7/24* (2006.01)
(52) U.S. Cl. ................................ 369/275.3; 369/53.19
(58) Field of Classification Search ........................ None
See application file for complete search history.

(56) References Cited

U.S. PATENT DOCUMENTS

| 6,370,091 | B1 * | 4/2002 | Kuroda ..................... 369/30.08 |
| 7,180,849 | B2 * | 2/2007 | Hirokane et al. ............ 369/286 |
| 7,209,410 | B2 * | 4/2007 | Yamanushi et al. ............ 369/2 |
| 7,215,634 | B2 * | 5/2007 | Van Woudenberg ...... 369/275.3 |

FOREIGN PATENT DOCUMENTS

| JP | 2000-311346 | 11/2000 |
| JP | 2002-216361 | 8/2002 |
| JP | 2003-242653 | 8/2003 |

\* cited by examiner

*Primary Examiner*—Joseph H Feild
*Assistant Examiner*—Tawfik Goma
(74) *Attorney, Agent, or Firm*—Young & Thompson

(57) ABSTRACT

An information recording apparatus (300) is for recording record information onto an information recording medium (100) comprising a first recording layer (L0 layer) and a second recording layer (L1 layer) to record therein the record information by irradiating laser light. The information recording apparatus is provided with: a recording device (352) for recording the record information into at least one of the first recording layer and the second recording layer by irradiating the laser light; and a controlling device (354) for controlling the recording device to record the record information into a target area (115*a*), which is a recording area of the second recording layer corresponding to a recording area (105*a*) of the first recording layer in which the record information is recorded, if the record information is recorded into the second recording layer.

4 Claims, 13 Drawing Sheets

[FIG. 1]
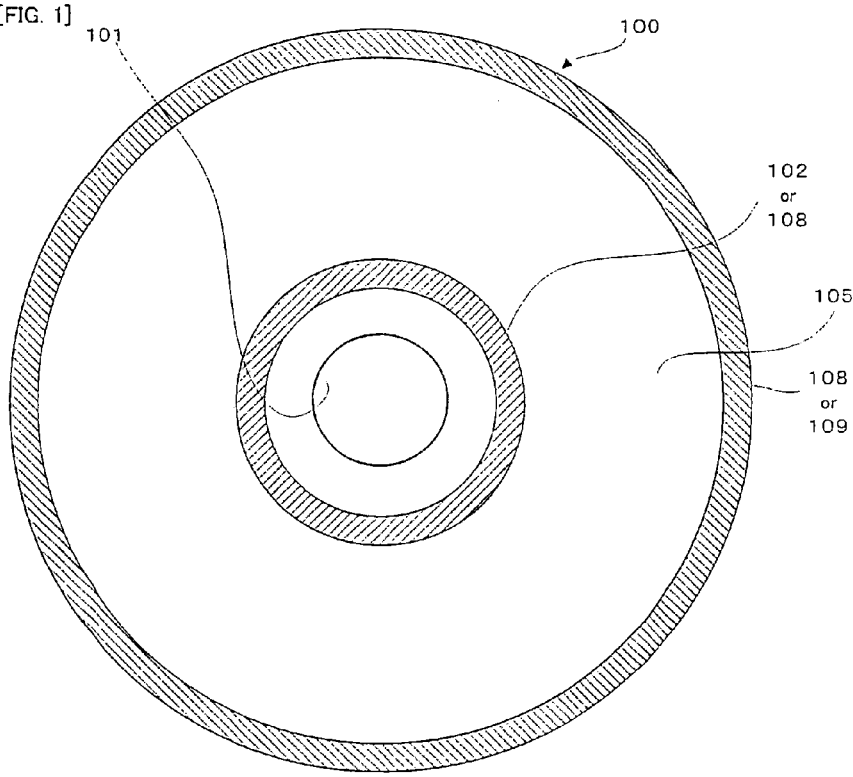
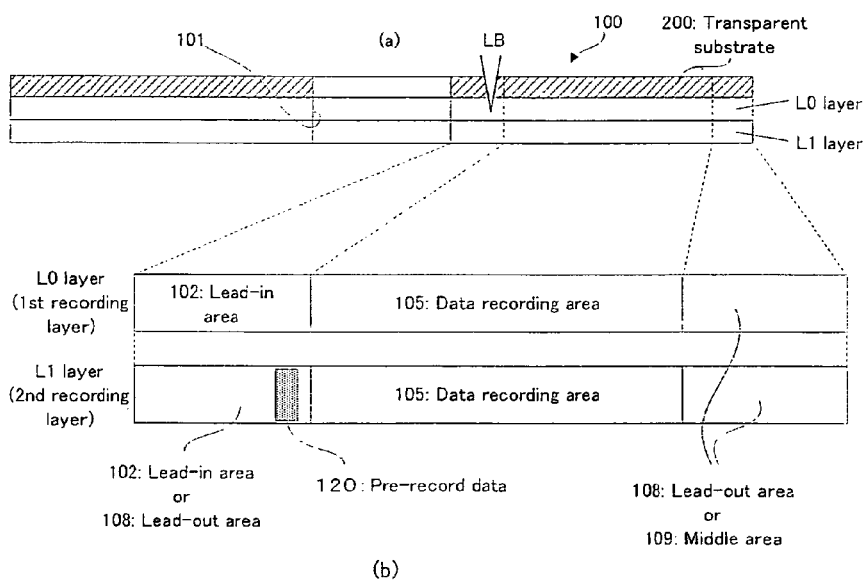

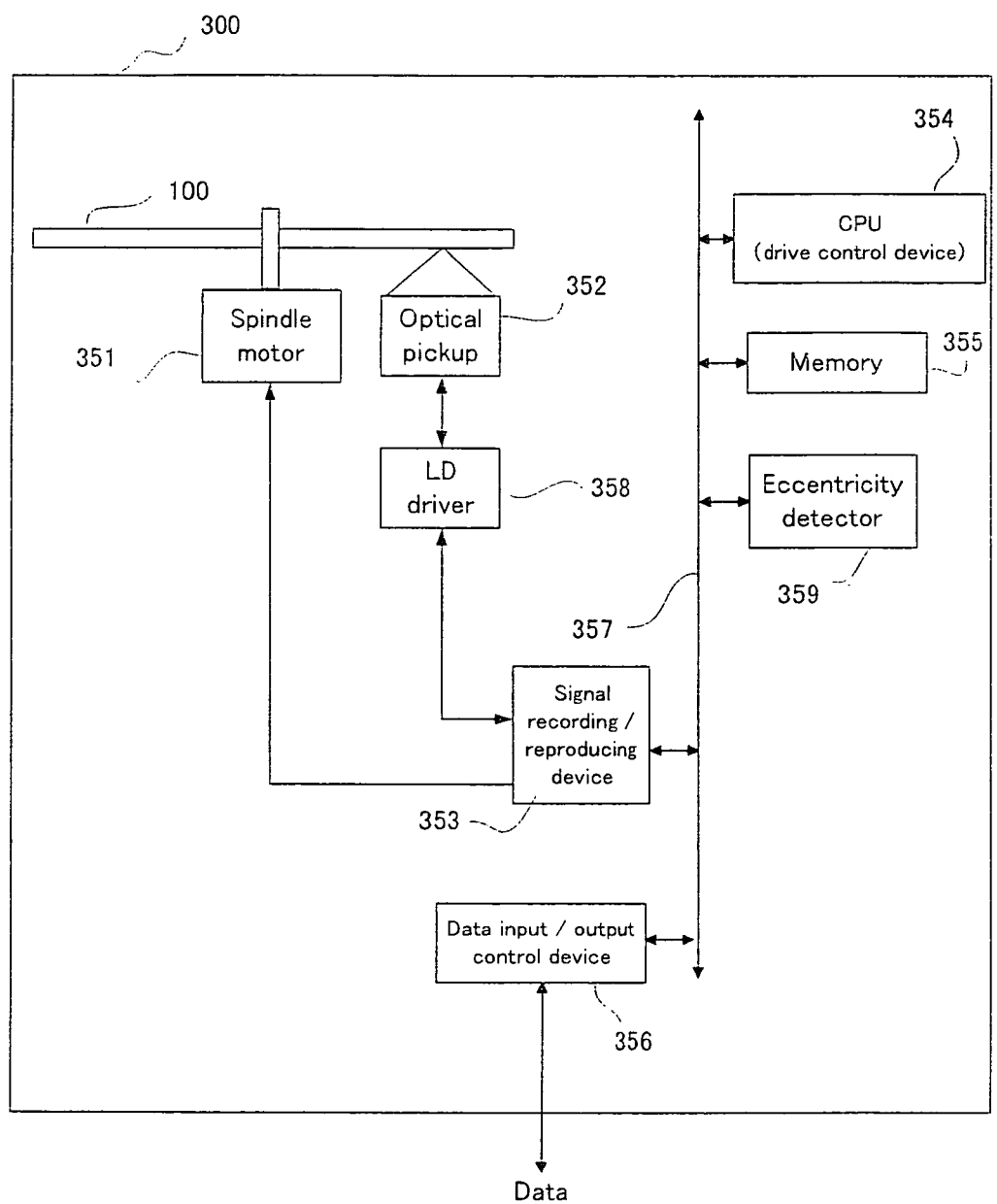
[FIG. 2]

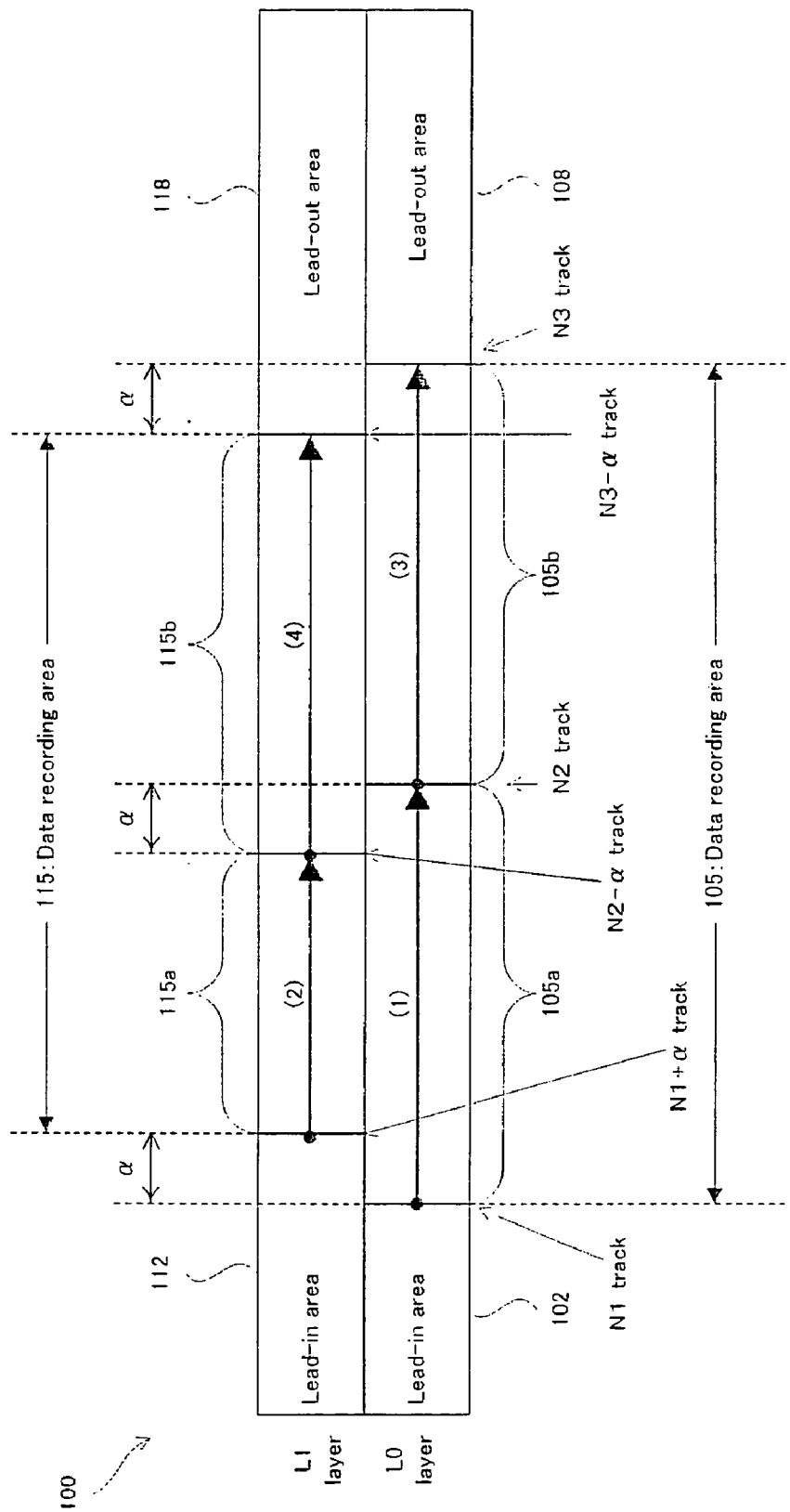
[FIG. 3]

[FIG. 4]
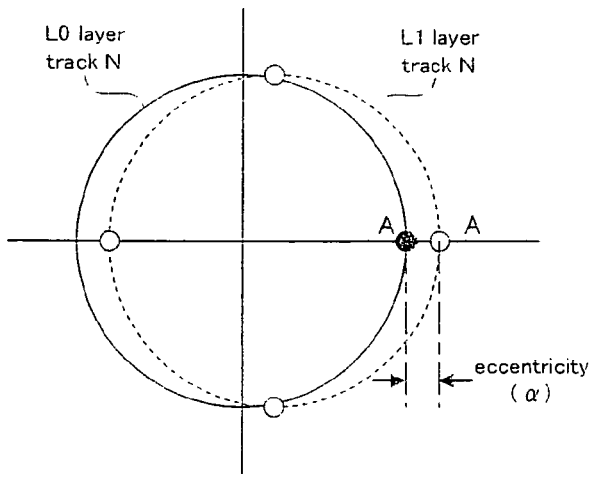
[FIG. 5]
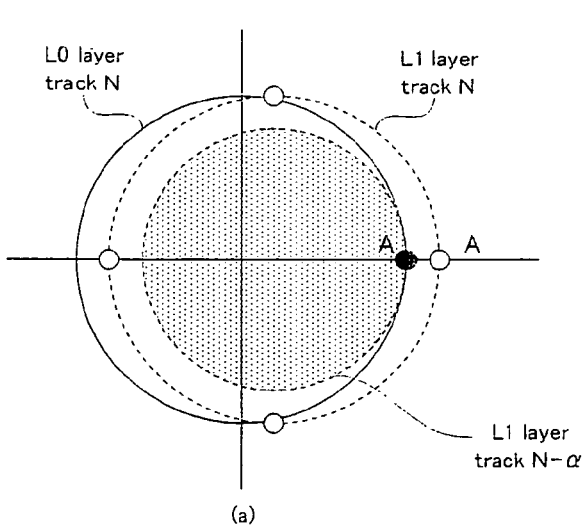
(a)
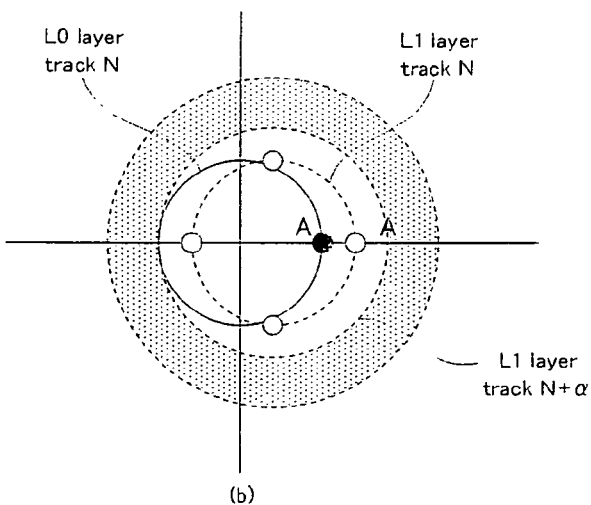
(b)

[FIG. 6]
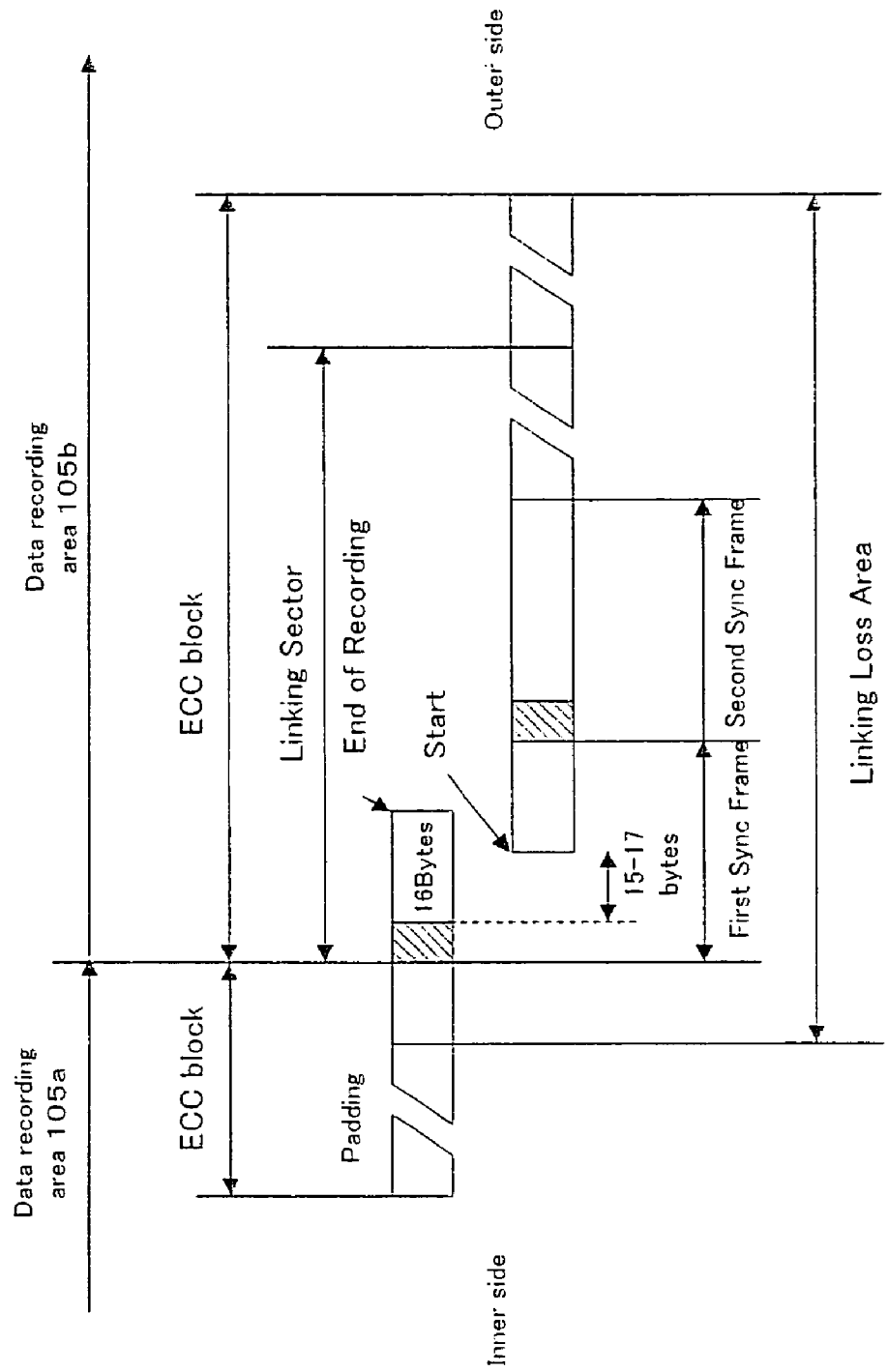

[FIG. 7]
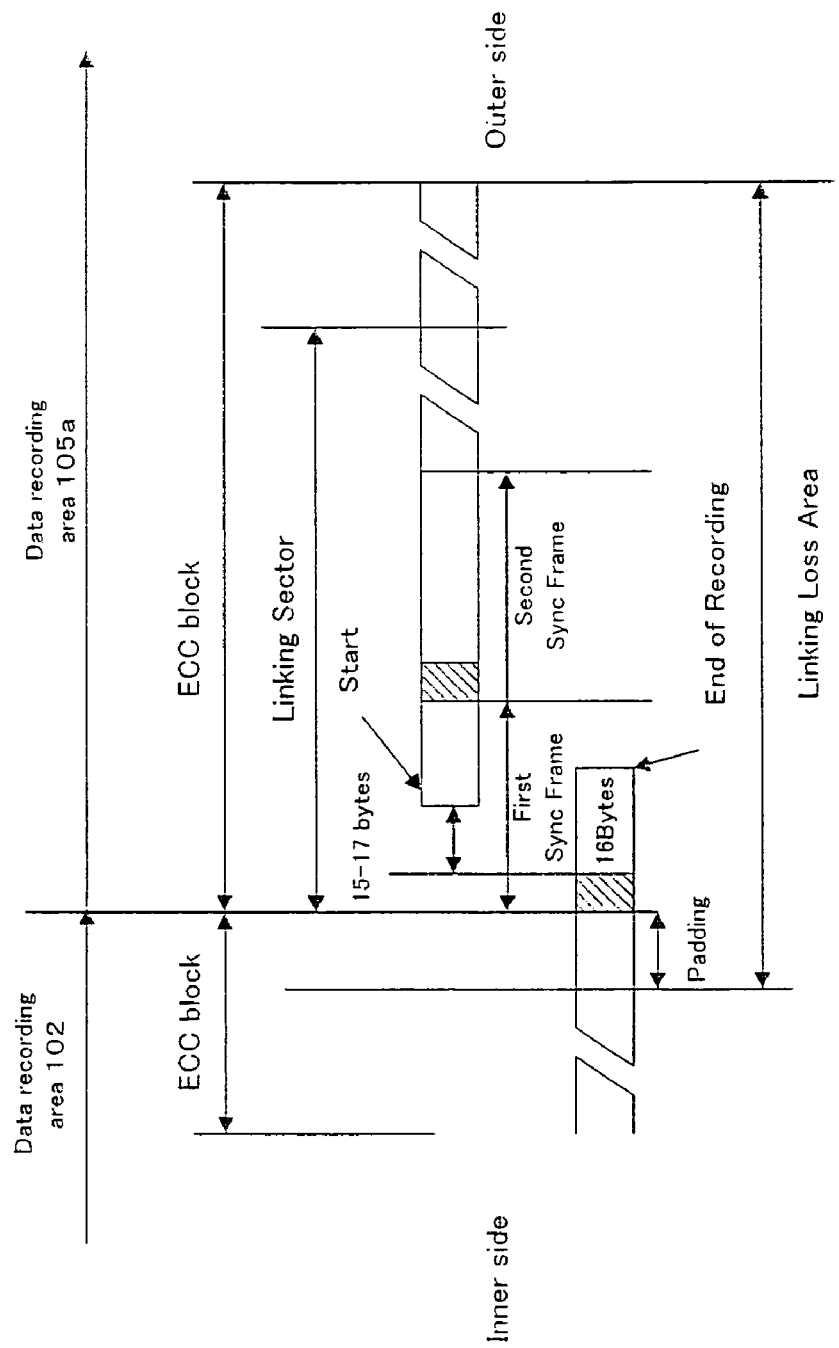

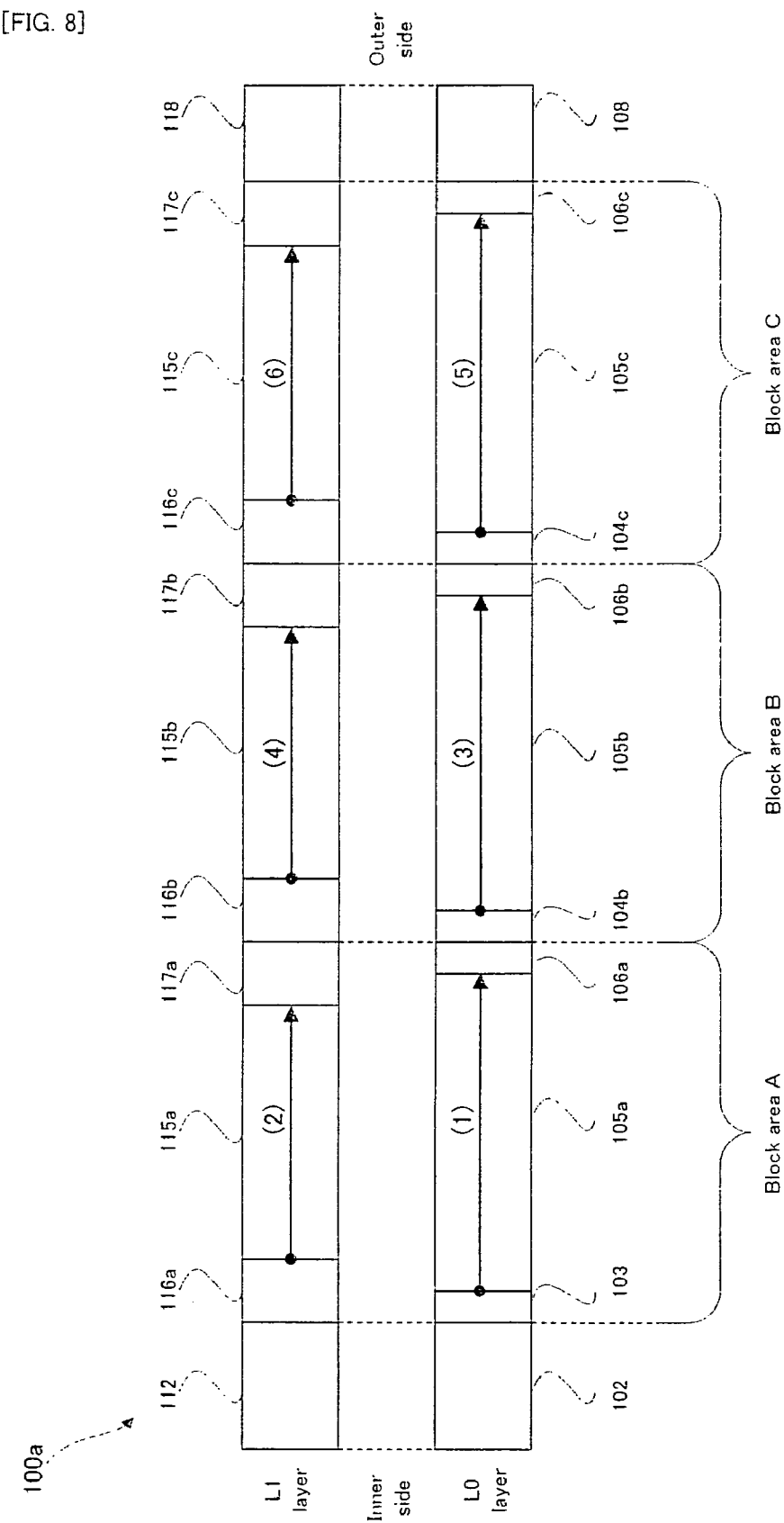
[FIG. 8]

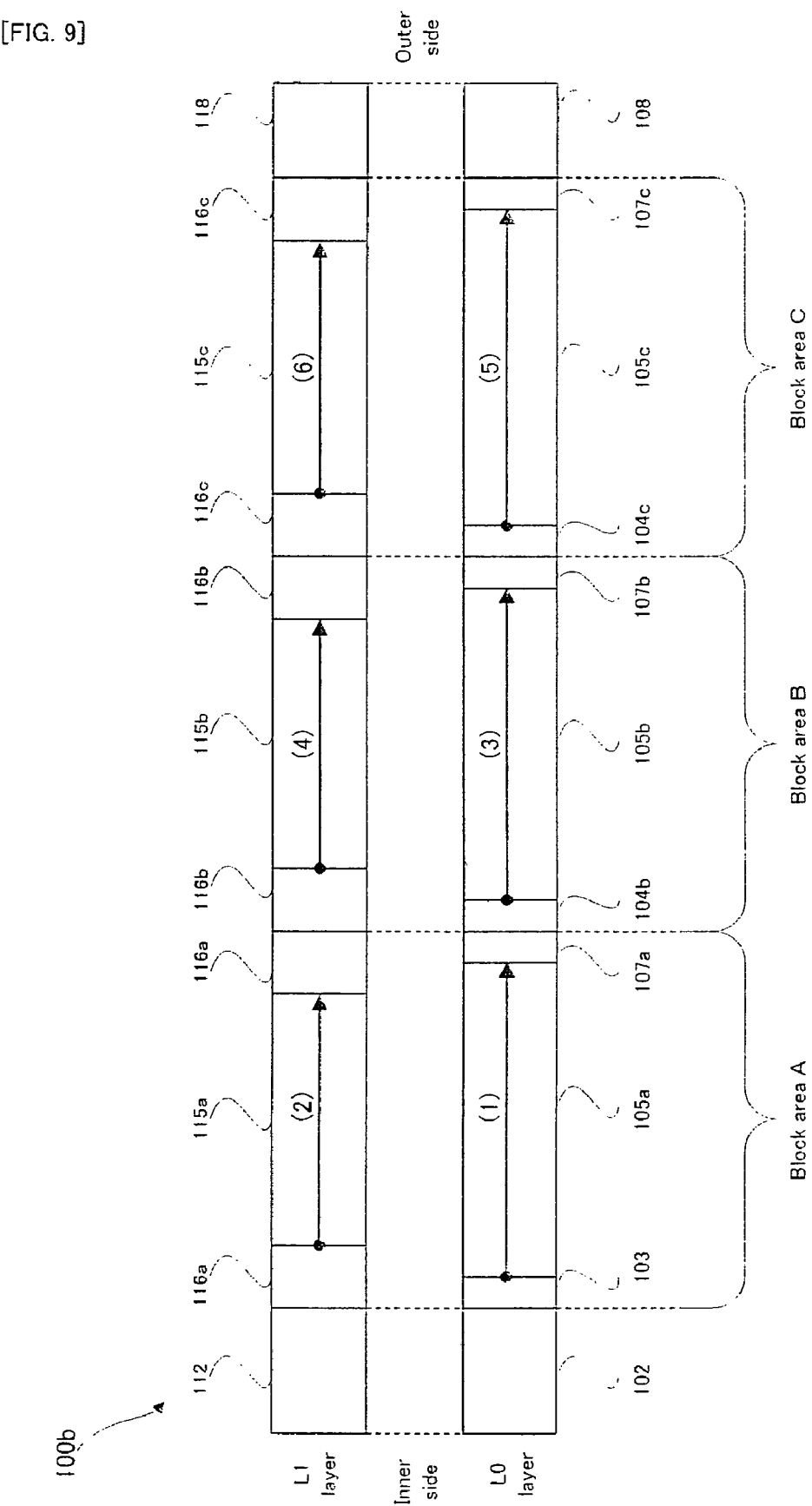
[FIG. 9]

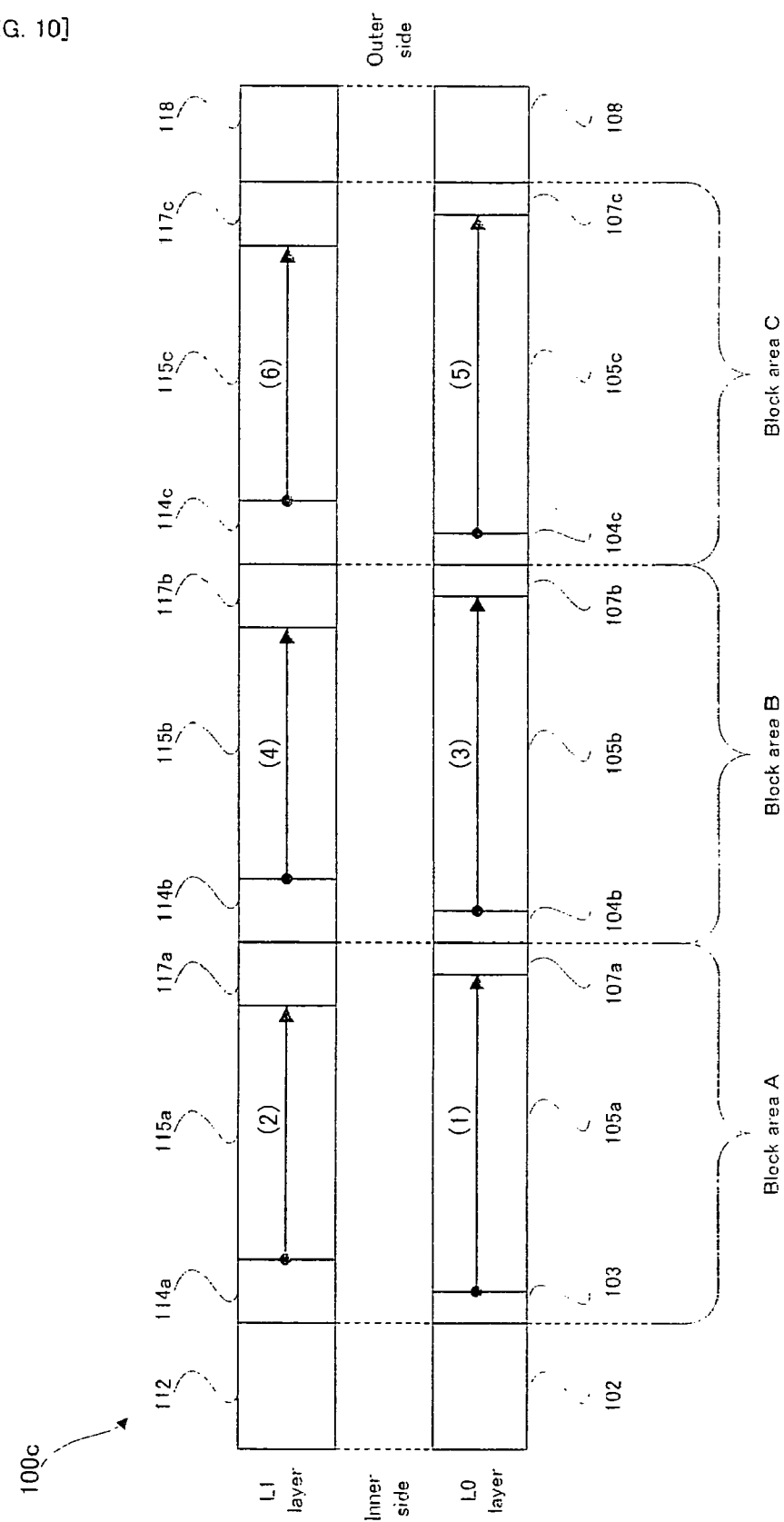
[FIG. 10]

[FIG. 11]
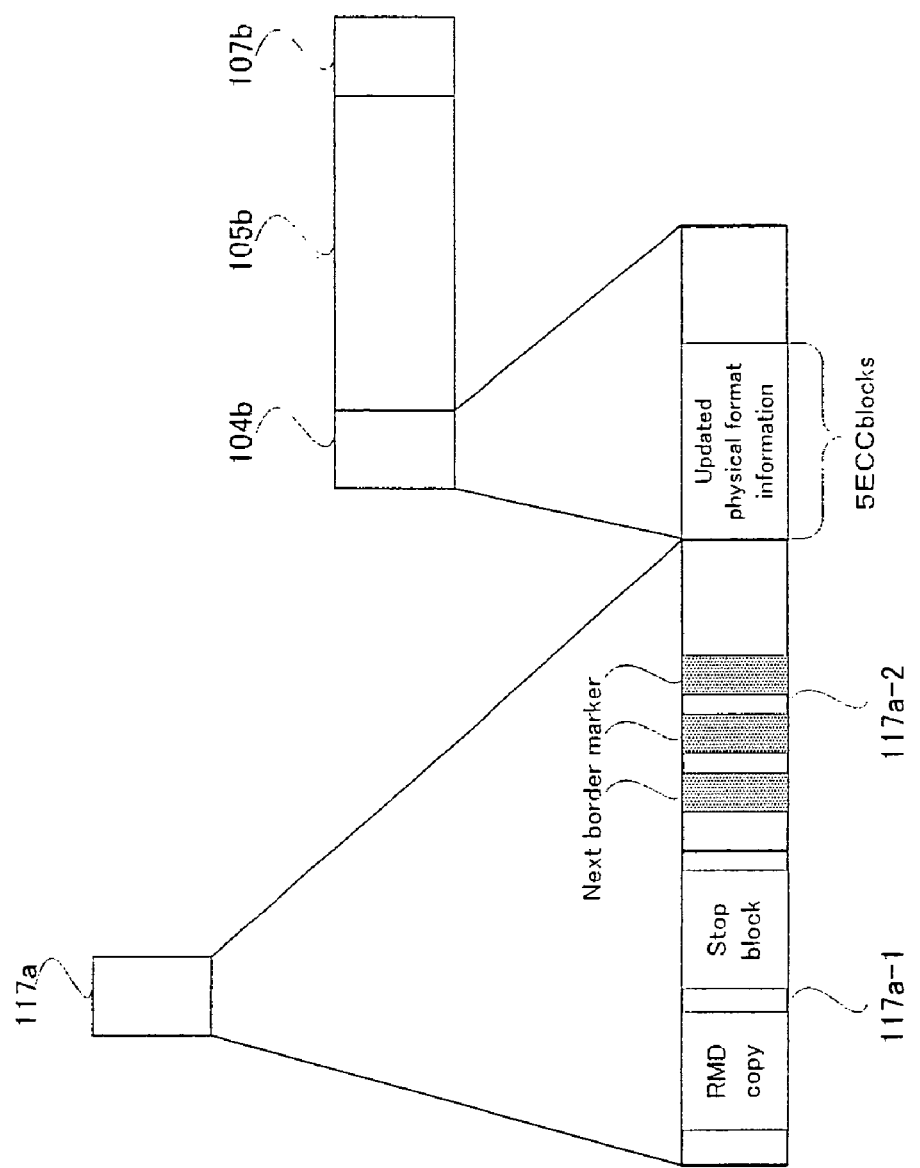

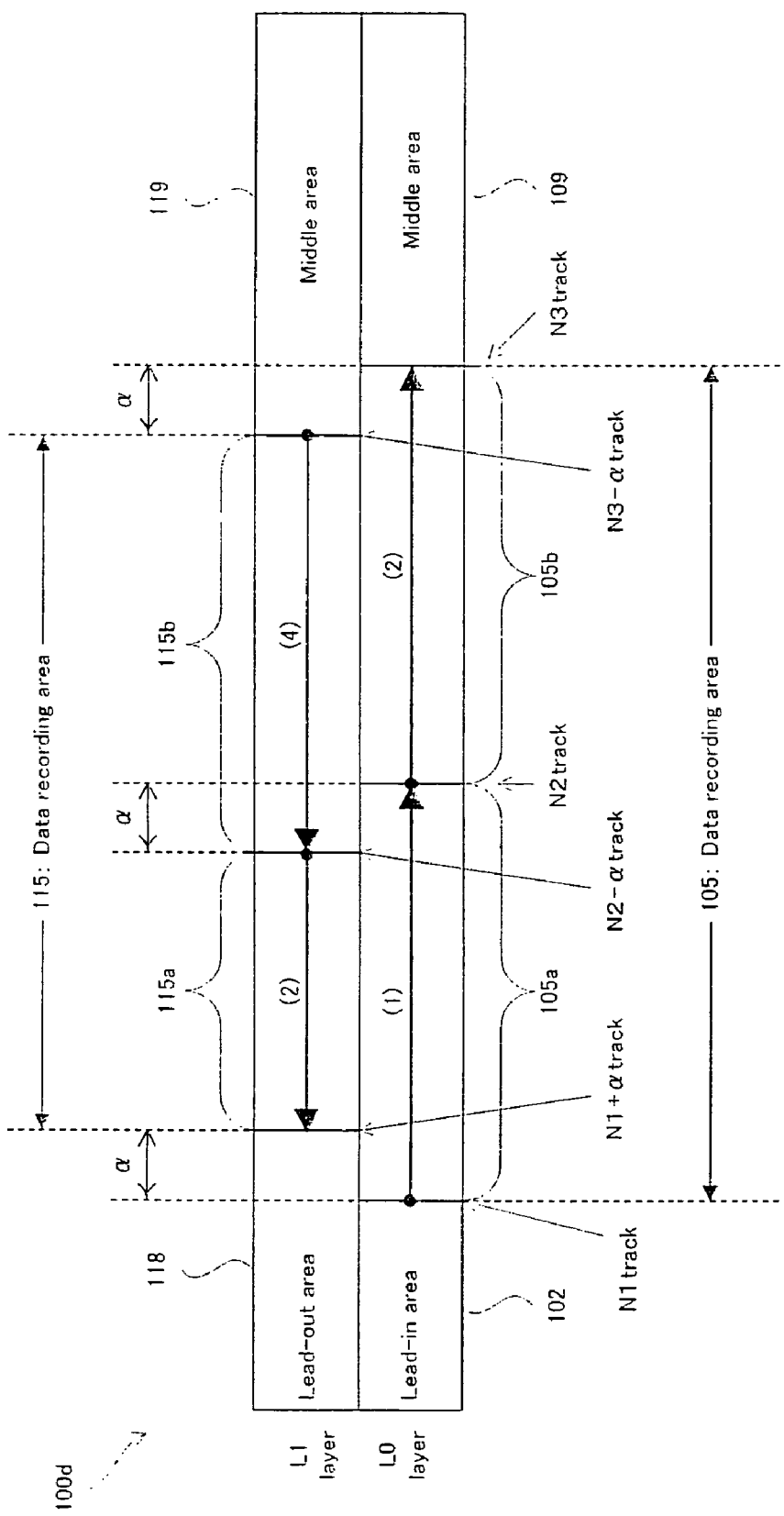
[FIG. 12]

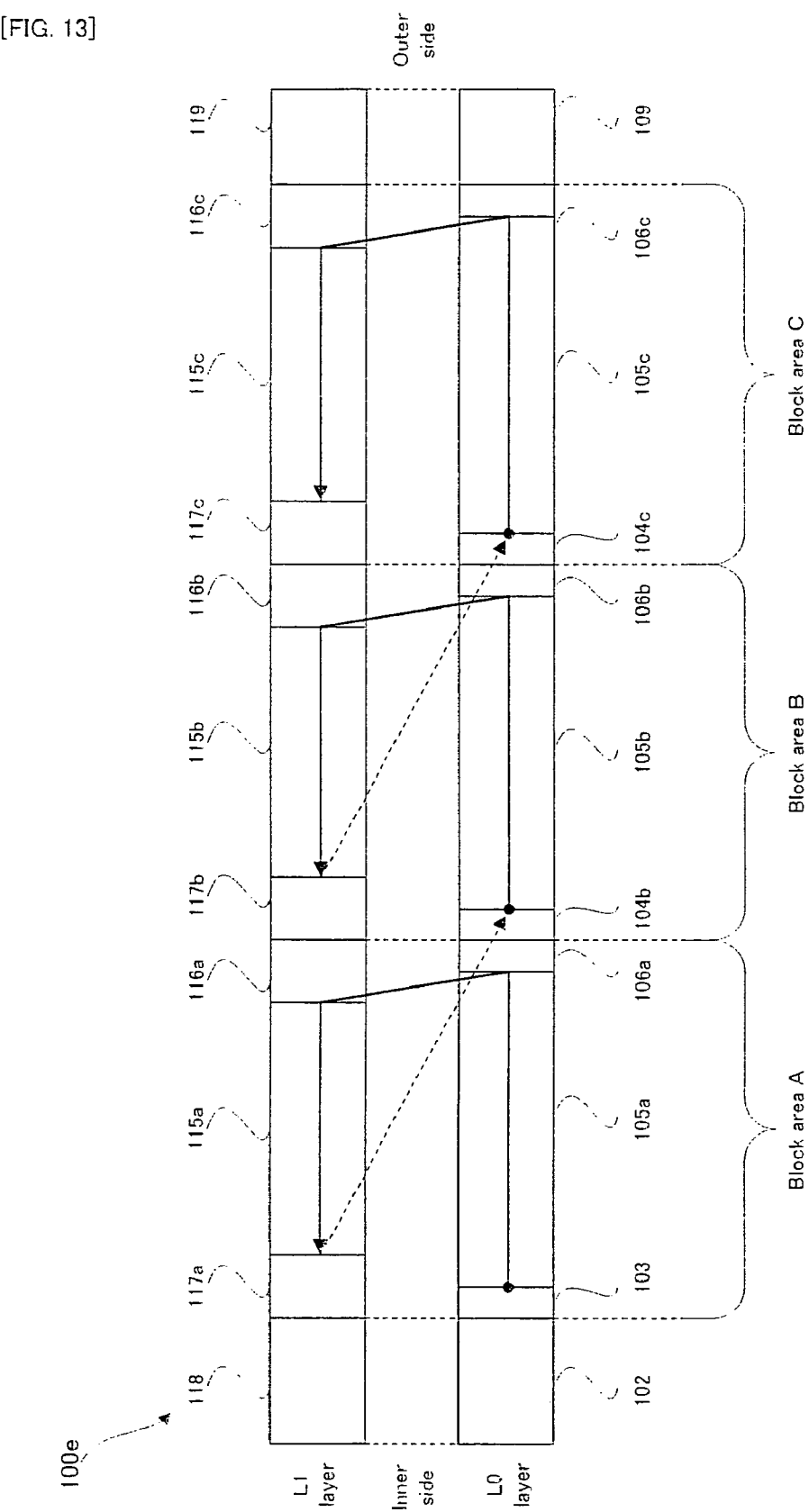
[FIG. 13]

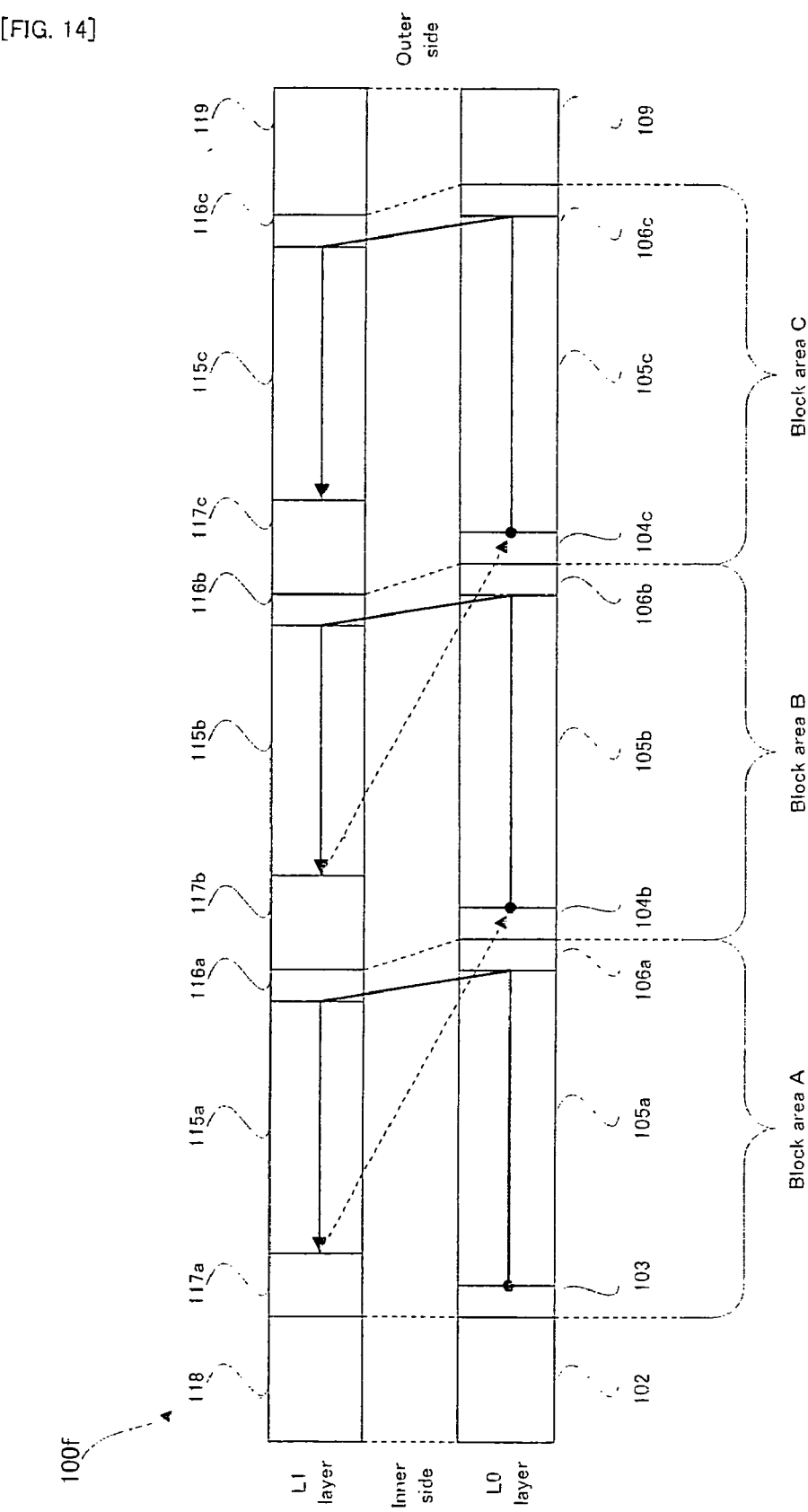
[FIG. 14]

INFORMATION RECORDING MEDIUM, INFORMATION RECORDING DEVICE AND METHOD, AND COMPUTER PROGRAM

TECHNICAL FIELD

The present invention relates to an information recording apparatus and an information recording method, such as a DVD recorder, and a computer program which makes a computer function as such an information recording apparatus, for example.

BACKGROUND ART

For example, with regard to an information recording medium, such as an optical disc, like a CD-ROM (Compact Disc-Read Only Memory), a CD-R (Compact Disc-Recordable), and a DVD (Digital Versatile Disk)-ROM, there has been also developed an optical disc of a multilayer type or double layer type or multiple layer type in which a plurality of recording layers are laminated on the same substrate. More specifically, a dual-layer type optical disc, i.e. a two-layer type optical disc, has a first recording layer which is on the nearest side viewed from the irradiation side of laser light in recording by using an information recording apparatus (i.e. on the closest side to an optical pickup), as a first layer (wherein the first recording layer is referred to as a "L0 layer", as occasion demands, in this application). Moreover, it has a semi-transparent reflective film located on the rear side of the first recording layer (i.e. on the farther side viewed from the irradiation side of the laser light). The dual-layer type optical disc has a second recording layer which is located on the rear side of the semi-transparent reflective film via a middle layer, such as an adhesion layer, as a second layer (wherein the second recording layer is referred to as a "L1 layer", as occasion demands, in this application). Moreover, it has a reflective film located on the rear side of the second recording layer. Then, in preparing such a multilayer type information recording medium, the L0 layer and the L1 layer may be separately formed, and they are bonded together in the end, to thereby produce the dual-layer type optical disc at low cost.

In the information recording apparatus, such as a CD recorder, for recording information onto such a dual-layer type optical disc, the information is recorded into the L0 layer in a rewritable method or irreversible change recording method such as irreversible change recording heat by using heat or the like, by focusing the laser light for recording onto the L0 layer, and the information is recorded into the L1 layer in a rewritable method or irreversible change recording method by heat or the like, by focusing the laser light onto the L1 layer.

Patent document 1: Japanese Patent Application Laying Open NO. 2000-311346

DISCLOSURE OF INVENTION

Subject to be Solved by the Invention

In such a dual-layer type optical disc, if the data is recorded into the L1 layer, it is necessary to irradiate the laser light through the L0 layer. In this case, in the L0 layer through which the laser light is irradiated, the data is recorded in some cases, and the data is not recorded in some cases. As described above, the recording status of the L0 layer is not always standardized, which changes the conditions of the laser light to be irradiated onto the L1 layer. Thus, there is such a technical problem that the data cannot be properly recorded into the L1 layer, depending on the recording status of the L0 layer. In particular, there is a possibility that the L0 layer and the L1 layer are shifted from each other, due to an eccentricity. Due to the shift caused by the eccentricity, there is also such a technical problem that even if the data is already recorded on one track of the L0 layer, the laser light is not always irradiated through the one track of the L0 layer when the data is recorded onto another track of the L1 layer having the same track number as that of the one track.

In order to solve the above-mentioned conventional problems, it is therefore an object of the present invention to provide an information recording medium, an information recording apparatus, and an information recording method, which enable proper information recording even on the information recording medium having a plurality of recording layers, for example, and a computer program which makes a computer function as such an information recording apparatus.

Means for Solving the Object

Information Recording Apparatus

The above object of the present invention can be achieved by an information recording apparatus for recording record information onto an information recording medium provided with a first recording layer and a second recording layer to record therein the record information by irradiating laser light, the information recording apparatus provided with: a recording device for recording the record information into at least one of the first recording layer and the second recording layer by irradiating the laser light; and a controlling device for controlling the recording device to record the record information into a target area, which is a recording area of the second recording layer corresponding to a recording area of the first recording layer in which the record information is recorded, if the record information is recorded into the second recording layer.

According to the information recording apparatus of the present invention, as in the information recording medium of the present invention, it is possible to calculate an optimum recording power in each recording layer of the information recording medium having the plurality of recording layers, relatively easily.

In the present invention, by the operation of the controlling device, it is possible to record the record information into the target area of the second recording layer corresponding to the recording area of the first recording layer in which the record information is recorded. Thus, if the record information is recorded into the second recording layer, located on the rear side (or the farther side) of the first recording layer viewed from the laser irradiation side, for example, the laser light is irradiated through the first recording layer in which the record information is already recorded. In other words, it is hardly necessary or not necessary at all to record the record information into the second recording layer by irradiating the laser light through the first recording layer in which the record information is unrecorded. Alternatively, if the record information is recorded into the second recording layer, located on the nearest side (or the closer side) of the first recording layer viewed from the laser irradiation side, for example, the laser light is irradiated onto the second recording layer corresponding to the first recording layer in which the record information is already recorded. In other words, it is hardly necessary or not necessary at all to record the record information into the second recording layer by irradiating the laser light onto the second recording layer corresponding to the first recording layer in which the record information is unrecorded. Therefore, without changing the conditions of the laser light to be irradiated, it is possible to properly record the record information throughout almost the entire surface of the second recording layer. Thus, it is possible to obtain good recording features throughout almost the entire surface of the second recording layer. Of course, it is obvious that the record information can be properly recorded throughout almost the entire surface of the first recording layer, regardless of the recording status of the second recording layer.

If such a controlling device is not provided, the record information is recorded into the second recording layer, regardless of whether or not the record information is already recorded in the first recording layer. Therefore, if the recording is performed by using the same laser light, the recording status of the first recording layer causes variations in recording features of the record information that is recorded into the second recording layer, which is not preferable. On the other hand, in order to ensure the good recording features, it is necessary to change the conditions of the laser light, depending on the recording status of the first recording layer, which is not preferable because a processing cost increases. According to the present invention, however, there is a great advantage in that such a disadvantage can be eliminated.

Consequently, according to the information recording apparatus of the present invention, if the record information is recorded into the second recording layer, it is possible to irradiate the laser light onto the second recording layer corresponding to the first recording layer in which the record information is already recorded. Thus, it is possible to properly record the record information throughout almost the entire surface of the second recording layer.

In one aspect of the information recording apparatus of the present invention, the controlling device controls the recording device to record the record information into a target area portion, except for at least one portion of an edge portion of the target area, out of the target area.

According to this aspect, it is possible to record the record information into the target area portion, which is smaller than the recording area of the first recording layer in which the record information is already recorded. Thus, even if the first recording layer and the second recording layer do not properly correspond to each other (e.g. there is an eccentricity or the like), it is possible to irradiate the laser light through the first recording layer in which the record information is already recorded, in the target area portion which is the smaller recording area. This is because even if there is a positional error between the first recording layer and the second recoding layer, or even if the recording areas of the both recording layers with the same address or same track do not properly correspond to each other and thus there is a positional error between the recording layers, it is possible to eliminate an influence of the error, by eliminating the edge portion.

In an aspect of the information recording apparatus in which the record information is recorded into the target area portion, as described above, if directions of recording the record information in the first recording layer and the second recording layer are opposite to each other and if the recording is performed in the second recording layer after the recording is performed in the first recording layer, the controlling device may control the recording device, after recording the record information into the first recording layer, to return an irradiation position of the laser light by a size corresponding to the at least one portion of the edge portion, to focus the laser light onto the second recording layer, and to start the recording of the record information from a recording area of the second recording layer in which an address is firstly detected.

By virtue of such construction, by the operation of the controlling device, the irradiation position of the laser light is returned, by the recording area corresponding to the size of the one portion of the edge portion, in order to eliminate the at least one portion of the edge portion from the recording target. Specifically, the laser light irradiation position is displaced to the opposite side to the recording direction of recording the record information in the first recording layer. After that, by performing focus transition (i.e. layer jump) of the laser light from the first recording layer to the second recording layer in order to focus the laser light onto the second recording layer, it is possible to irradiate the laser light onto the second recording layer corresponding to the first recording layer in which the record information is already recorded, as described above. By this, it is possible to receive the above-mentioned various benefits.

In an aspect of the information recording apparatus in which the record information is recorded into the target area portion, as described above, if directions of recording the record information in the first recording layer and the second recording layer are opposite to each other and if the recording is performed in the second recording layer after the recording is performed in the first recording layer, the controlling device may control the recording device, after recording the record information into the first recording layer, to focus the laser light onto the second recording layer, to return an irradiation position of the laser light by a size corresponding to the at least one portion of the edge portion, and to start the recording of the record information from a recording area of the second recording layer in which an address is firstly detected.

By virtue of such construction, by the operation of the controlling device, the focus transition (i.e. layer jump) of the laser light from the first recording layer to the second recording layer is performed in order to focus the laser light onto the second recording layer. After that, the irradiation position of the laser light is returned, by the recording area corresponding to the size of the one portion of the edge portion, in order to eliminate the at least one portion of the edge portion from the recording target. Specifically, the laser light irradiation position is displaced to the opposite side to the recording direction of recording the record information in the first recording layer. By this, it is possible to irradiate the laser light onto the second recording layer corresponding to the first recording layer in which the record information is already recorded, as described above. By this, it is possible to receive the above-mentioned various benefits.

In an aspect of the information recording apparatus in which the record information is recorded into the target area portion, as described above, it may be further provided with an eccentricity detecting device for detecting an eccentricity indicating a shift between the first recording layer and the second recording layer, the controlling device controlling the recording device to record the record information into the target area portion, except for a recording area corresponding to a size of the detected eccentricity, as the edge portion.

By virtue of such construction, even if there is the eccentricity, the eccentricity can be detected by the eccentricity detecting device. Then, by the operation of the controlling device based on the detected eccentricity, it is possible to eliminate an influence of the eccentricity. As a result, it is possible to properly record the record information in the second recording layer corresponding to the first recording layer in which the record information is already recorded.

In an aspect of the information recording apparatus in which the record information is recorded into the target area portion, as described above, the controlling device may control the recording device to record the record information into the target area portion, except for a recording area corresponding to a maximum eccentric amount, as the edge portion, the maximum eccentric amount being set in advance as a maximum value of a size of the eccentricity, which indicates a shift between the first recording layer and the second recording layer.

By virtue of such construction, it is possible to properly record the record information in the second recording layer corresponding to the first recording layer in which the record information is already recorded, by eliminating an influence of the eccentricity or the like, relatively easily, without the detection of the eccentricity, as described above.

In an aspect of the information recording apparatus in which the record information is recorded, except for the recording area corresponding to the eccentricity (or the maximum eccentric amount), as described above, if the record information is recorded up to an N track recording area in the first recording layer and if the eccentricity whose size is $\alpha$ tracks exists, the controlling device controls the recording device to record the record information into the target area portion corresponding to a recording area of an N−$\alpha$ track or less.

By virtue of such construction, even if there is the eccentricity by the size of $\alpha$ tracks, it is possible to record the record information into the second recording layer in view of the eccentricity. Namely, the record information is recorded into the second recording layer, by providing a margin with a size corresponding to the size of the eccentricity. Thus, it is possible to record the record information into the target area of the second recording layer corresponding to the first recording layer in which the record information is already recorded, relatively easily.

Incidentally, even in the construction that the recording area corresponding to the maximum eccentric amount is removed as the edge portion, it is possible to adopt the same structure. Namely, by treating the extent of the maximum eccentric amount as the $\alpha$ tracks, it is possible to receive the same benefits.

In an aspect of the information recording apparatus in which the record information is recorded, except for the recording area corresponding to the eccentricity (or the maximum eccentric amount), as described above, if the record information is not recorded in a recording area of an n track or less in the first recording layer and if the eccentricity whose size is $\alpha$ tracks exists, the controlling device controls the recording device to record the record information into the target area portion corresponding to a recording area of an n+$\alpha$ track or more.

By virtue of such construction, even if there is the eccentricity by the size of $\alpha$ tracks, it is possible to record the record information into the second recording layer in view of the eccentricity. Namely, the record information is recorded into the second recording layer, by providing a margin with a size corresponding to the size of the eccentricity. Thus, it is possible to record the record information into the target area of the second recording layer corresponding to the first recording layer in which the record information is already recorded, relatively easily.

Incidentally, even in the construction that the recording area corresponding to the maximum eccentric amount is removed as the edge portion, it is possible to adopt the same structure. Namely, by treating the extent of the maximum eccentric amount as the $\alpha$ tracks, it is possible to receive the same benefits.

In another aspect of the information recording apparatus of the present invention, area management information indicating at least one portion of the target area portion is recorded in advance on the information recording medium, and the controlling device controls the recording device to record the record information into the target area by reading the area management information.

According to this aspect, for example, by that the controlling device refers to the area management information, which indicates a recordable area of the second recording layer, in advance, it is possible to record the record information into the target area (or the target area portion) of the second recording layer, relatively easily.

(Information Recording Method)

The above object of the present invention can be also achieved by an information recording method in an information recording apparatus provided with a recording device capable of recording record information onto an information recording medium provided with a first recording layer and a second recording layer to record therein the record information by irradiating laser light, the information recording method provided with: a recording process of recording the record information into at least one of the first recording layer and the second recording layer by irradiating the laser light; and a controlling process of controlling the recording device to record the record information into a target area, which is a recording area of the second recording layer corresponding to a recording area of the first recording layer in which the record information is recorded, if the record information is recorded into the second recording layer.

According to the information recording method of the present invention, it is possible to receive the same various benefits as those of the information recording apparatus of the present invention.

Incidentally, in response to the various aspects owned by the above-mentioned information recording apparatus of the present invention, the information recording method of the present invention can also adopt various aspects.

In one aspect of the information recording method of the present invention, the controlling process controls the recording device to record the record information into a target area portion, except for an edge portion of the target area, out of the target area.

According to this aspect, even if the first recording layer and the second recording layer do not properly correspond to each other, it is possible to irradiate the laser light through the first recording layer in which the record information is already recorded, in the target area portion which is the smaller recording area.

In an aspect of the information recording method in which the record information is recorded into the target area portion, as described above, it is further provided with an eccentricity detecting process of detecting an eccentricity indicating a shift between the first recording layer and the second recording layer, the controlling process controlling the recording device to record the record information into the target area portion, except for a recording area corresponding to a size of the detected eccentricity, as the edge portion.

By virtue of such construction, even if there is the eccentricity, the eccentricity can be detected in the eccentricity detecting process. Then, by the operation of the controlling process based on the detected eccentricity, it is possible to eliminate an influence of the eccentricity. As a result, it is possible to properly record the record information in the second recording layer corresponding to the first recording layer in which the record information is already recorded.

In an aspect of the information recording method in which the record information is recorded into the target area portion, as described above, the controlling process may control the recording device to record the record information into the target area portion, except for a recording area corresponding to a maximum eccentric amount, as the edge portion, the maximum eccentric amount being set in advance as a maximum value of a size of the eccentricity, which indicates a shift between the first recording layer and the second recording layer.

By virtue of such construction, it is possible to properly record the record information in the second recording layer corresponding to the first recording layer in which the record information is already recorded, by eliminating an influence of the eccentricity or the like, relatively easily, without the detection of the eccentricity, as described above.

(Computer Program)

The above object of the present invention can be also achieved by a computer program for recording control to control a computer provided in the above-mentioned information recording apparatus of the present invention (including its various aspects), the computer program making the computer function as at least one of the recording device and the controlling device.

According to the computer program of the present invention, the above-mentioned information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the above-mentioned information recording apparatus of the present invention, the computer program of the present invention can also adopt various aspects.

The above object of the present invention can be also achieved by a computer program product in a computer-readable medium for tangibly embodying a program of instructions executable by a computer provided in the above-mentioned information recording apparatus of the present invention (including its various aspects), to make the computer function as at least one of the recording device and the controlling device.

According to the computer program product of the present invention, at least one of the recording device and the controlling device of the present invention described above can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as at least one of the recording device and the controlling device of the present invention described above.

(Information Recording Medium)

The above object of the present invention can be also achieved by an information recording medium provided with a first recording layer and a second recording layer to record therein record information by irradiating laser light, at least one of the first recording layer and the second recording layer provided with a management information area to record therein area management information indicating at least one portion of a target area portion except for an edge portion of a target area, with respect to at least one portion of the target area of the second recording layer corresponding to a recording area of the first recording layer in which the record information is to be recorded.

According to the information recording medium of the present invention, it is possible to record the various record information into each of the plurality of recording layers (i.e. the first recording layer and the second recording layer). The plurality of recording layers may be formed in a lamination structure on one side of a substrate, for example.

Particularly in the present invention, the area management information, which indicates at least one portion of the target area, may be recorded. Therefore, if the above-mentioned information recording apparatus refers to the area management information, it is possible to record the record information into the second recording layer, by using the laser light irradiated through the first recording layer in which the data is already recorded, relatively easily. Therefore, it is possible to receive the various benefits owned by the above-mentioned information recording apparatus of the present invention.

These effects and other advantages of the present invention will become more apparent from the following embodiments.

As explained above, according to the information recording apparatus of the present invention, it is provided with the recording device and the controlling device, and according to the information recording method of the present invention, it is provided with the recording process and the controlling process. Therefore, it is possible to properly record the record information throughout almost the entire surface of the second recording layer.

Moreover, the information recording apparatus of the present invention is provided with information recording apparatus of the present invention or the recording process and the controlling process. Therefore, if the record information is recorded into the second recording layer, it is possible to irradiate the laser light through the first recording layer in which the record information is already recorded. Thus, it is possible to properly record the record information throughout almost the entire surface of the second recording layer.

BRIEF DESCRIPTION OF DRAWINGS

FIG. 1 are a substantial plan view showing the basic structure of an optical disc having a plurality of recording areas in an embodiment of the information recording medium of the present invention, and a schematic cross sectional view of the optical disc and a corresponding conceptual diagram showing a recording area structure in the radial direction.

FIG. 2 is a block diagram conceptually showing the basic structure of an embodiment of the information recording apparatus of the present invention.

FIG. 3 is a data structure diagram conceptually showing one aspect in which data is recorded onto the optical disc, by the operation of the information recording apparatus in the embodiment.

FIG. 4 is a plan view conceptually showing an aspect of the eccentricity of the optical disc in the embodiment.

FIG. 5 are plan views conceptually showing aspects in which data is recorded onto the optical disc, by the operation of the information recording apparatus in the embodiment.

FIG. 6 is a data structure diagram conceptually showing one specific example of the data structure recorded on a boundary of areas, by the operation of the information recording apparatus in the embodiment.

FIG. 7 is a data structure diagram conceptually showing another specific example of the data structure recorded on the boundary of the areas, by the operation of the information recording apparatus in the embodiment.

FIG. 8 is a data structure diagram conceptually showing one data structure of the optical disc in such an aspect that the data is additionally recorded or written once by using a border zone, by the operation of the information recording apparatus in the embodiment.

FIG. 9 is a data structure diagram conceptually showing another data structure of the optical disc in such an aspect that the data is written once by using the border zone, by the operation of the information recording apparatus in the embodiment.

FIG. 10 is a data structure diagram conceptually showing another data structure of the optical disc in such an aspect that the data is written once by using the border zone, by the operation of the information recording apparatus in the embodiment.

FIG. 11 is a data structure diagram explaining in more detail the data structures of a border-in area and a border-out area, generated by the information recording apparatus in the embodiment.

FIG. 12 is a data structure diagram conceptually showing another aspect in which the data is recorded onto the optical disc, by the operation of the information recording apparatus in the embodiment.

FIG. 13 is a data structure diagram conceptually showing another data structure of the optical disc in such an aspect that the data is written once by using the border zone, by the operation of the information recording apparatus in the embodiment.

FIG. 14 is a data structure diagram conceptually showing another data structure of the optical disc in such an aspect that the data is written once by using the border zone, by the operation of the information recording apparatus in the embodiment.

DESCRIPTION OF REFERENCE CODES

100 Optical disc
102, 112 Lead-in area
104, 114 Border-in area
105, 115 Data recording area
106, 116 Layer buffer area
107, 117 Border-out area
108, 118 Lead-out area
109, 119 Middle area
120 Pre-record data
300 Information recording apparatus
352 Optical pickup
354 CPU
355 Memory
359 Eccentricity detector
α eccentricity

BEST MODE FOR CARRYING OUT THE INVENTION

Hereinafter, the best mode for carrying out the present invention will be discussed in order for each embodiment, with reference to the drawings. Hereinafter, the embodiments of the present invention will be explained on the basis of the drawings.

(Embodiment of Information Recording Medium)

Firstly, with reference to FIG. 1, an embodiment of the information recording medium of the present invention will be explained.

Firstly, with reference to FIG. 1, the basic structure of an optical disc in the embodiment of the information recording medium of the present invention will be explained. FIG. 1(a) is a substantial plan view showing the basic structure of the optical disc having a plurality of recording areas in the embodiment of the information recording medium of the present invention, and FIG. 1(b) is a schematic cross sectional view of the optical disc and a corresponding conceptual diagram showing a recording area structure in the radial direction.

As shown in FIG. 1(a) and FIG. 1(b), an optical disc 100 has a recording surface on a disc main body with a diameter of about 12 cm, as is a DVD. On the recording surface, the optical disc 100 is provided with: a center hole 101 as the center; a lead-in area 102; a data recording area 105; and a lead-out area 108 or a middle area 109, which are related to the embodiment. Then, for example, on a transparent substrate 200 of the optical disc 100, there are laminated recording layers and the like. In each recording area of the recording layers, tracks, such as groove tracks and land tracks, are alternately placed, spirally or concentrically, centered on the center hole 101. On the track, data is divided and recorded by a unit of ECC block. The ECC block is a data management unit by a pre-format address in which record information is error-correctable.

Incidentally, the present invention is not particularly limited to the optical disc having these three areas. For example, even if the lead-in area 102, the lead-out area 108 or the middle area 109 does not exist, a data structure explained below can be constructed. Moreover, as described later, the lead-in area 102, the lead-out area 108 or the middle area 109 may be further segmentized.

Particularly, the optical disc 100 in the embodiment, as shown in FIG. 1(b), has such a structure that the L0 layer and the L1 layer, which constitute one example of the "first and second record layers" of the present invention as described later, respectively, are laminated on the transparent substrate. Upon the recording/reproduction of such a dual-layer type optical disc 100, the recording/reproduction in the L0 layer or the L1 layer is performed, depending on which recording layer has the focus position of laser light LB, irradiated from the upper to the lower side in FIG. 1(b).

Moreover, on the optical disc 100 in the embodiment, pre-record data 120 may be recorded, which is one specific example of the "area management information" of the present invention. The pre-record data 120 includes information indicating a data-recordable area of the L1 layer (or one portion of the data-recordable area and a boundary portion of the data-recordable area), as described later. The pre-record data 120 is not only recorded into the lead-in area 102 or the lead-out area 108 of the L1 layer, but also may be recorded into the L0 layer. Alternatively, it may be recorded into other areas of the L0 layer or the L1 layer.

Moreover, the pre-record data 120 may be recorded as a recording pit or a record mark on the optical disc 100, or may be recorded by an embossed pit, or may be recorded as a land-pre pit (LPP). Moreover, it may be recorded as wobble on which predetermined modulation is performed.

Moreover, the optical disc 100 in the embodiment is not limited to a two-layer single sided type, i.e., a dual layer type, but may be a two-layer double sided type, i.e., a dual layer double sided type. Furthermore, the optical disc 100 in the embodiment is not limited to the optical disc having the two recording layers, as described above, but may be an optical disc of a multilayer type which has three or more layers.

Incidentally, an explanation will be given later for a recording/reproducing procedure by an opposite track pass manner or parallel track pass manner in the dual-layer type optical disc, and the data structure of each layer.

(Embodiment of Information Recording Apparatus)

Next, the embodiment of the information recording apparatus of the present invention will be discussed with reference to FIG. 2 to FIG. 14.

(1) Basic Structure

Firstly, with reference to FIG. 2, the basic structure of the information recording apparatus in the embodiment will be explained. FIG. 2 is a block diagram conceptually showing the basic structure of the information recording apparatus in the embodiment.

As shown in FIG. 2, an information recording apparatus 300 is provided with: the optical disc. 100; a spindle motor 351; an optical pickup 352; a signal recording/reproducing device 353; a CPU (drive control device) 354; a memory 355; a data input/output control device 356; a Laser Diode (LD) driver 358; an eccentricity detector 359; and a bus 357.

The spindle motor 351 is intended to rotate and stop the optical disc 100, and operates upon accessing the optical disc. More specifically, the spindle motor 351 is constructed to rotate and stop the optical disc 100 at a predetermined speed, under spindle servo from a not-illustrated servo unit or the like.

The optical pickup 352 is one specific example of the "recording device" of the present invention. The optical pickup 352 is to perform the recording/reproduction with respect to the optical disc 100, and is provided with a laser device, a lens, and the like. More specifically, the optical pickup 352 irradiates the optical disc 100 with a light beam, such as a laser beam, as reading light with a first power upon reproduction, and as writing light with a second power upon recording, with it modulated.

The signal recording/reproducing device 353 controls the spindle motor 351 and the optical pickup 352, to thereby perform the recording/reproduction with respect to the optical disc 100. Moreover, it may be also constructed to reproduce the data recorded on the optical disc 100.

The CPU (drive control device) 354 is connected to the signal recording/reproducing device 353 and the memory 355 through the bus 357, and controls the entire information recording apparatus 300 by giving an instruction to each controlling device. In general, software for operating the CPU 354 is stored in the memory 355.

The memory 355 is used in the general data processing on the disc drive 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as a recording device is stored; a buffer used for compression/decompression of video data; a RAM area into which a parameter required for the operation of a program or the like is stored; and the like.

In the data input/output control device 356, the data to be recorded onto the optical disc 100 is inputted from external equipment or the like, for example. Then, the data input/output control device 356 outputs the inputted data to the signal recording/reproducing device 353 through the bus 357. Incidentally, if the data recorded on the optical disc 100 can be reproduced, the data input/output control device 356 may be constructed to output the reproduced data to external output equipment, such as a liquid crystal display.

The LD driver 358 oscillates the laser diode or the like of the optical pickup 352 at a predetermined frequency, to thereby control the laser light irradiated from the optical pickup 352.

The eccentricity detector 359 is constructed to detect the eccentricity of the dual-layer type optical disc 100. For example, if the optical disc 100 is manufactured by bonding the L0 layer and the L1 layer, it is possible to detect a bonding error between the center of the L0 layer and the center of the L1 layer. Alternatively, it may be also constructed to detect an eccentricity caused by the warpage of the optical disc 100, and an eccentricity caused by a shift in the rotation center axis of the optical disc 100, for example. Then, the "eccentricity" in the explanation below, unless otherwise noted, means an eccentricity generated on the entire optical disc 100, including the above eccentricities, as in the "eccentricity" of the present invention.

Incidentally, the information recording apparatus 300 in the embodiment, explained with reference to FIG. 2, is also an example of an information recording/reproducing apparatus. Namely, the information recording apparatus 300 can reproduce the record information through the signal recording/reproducing device 353 (e.g. a head amplifier, a Radio Frequency (RF) detector, or the like). The information recording apparatus 300 in the embodiment includes the function of an information reproducing apparatus or the function of the information recording/reproducing apparatus.

(2) First Operation Example

Next, with reference to FIG. 3, the first aspect of a recording operation performed by the information recording apparatus 300 in the embodiment will be explained. FIG. 3 is a data structure diagram conceptually showing the aspect in which data is recorded onto the optical disc 100, by the information recording apparatus 300 in the embodiment. Incidentally, in the first operation example, an explanation will be given for the aspect of recording the data on the optical disc of a parallel track path type.

As shown in FIG. 3, firstly, data is recorded into a desired recording area of the L0 layer, by the operation of the information recording apparatus 300 in the embodiment. Namely, the data is recorded into a data recording area 105a, which is the recording area shown as (1) in FIG. 3.

After that, if data is recorded into the L1 layer, the data is recorded into the recording area of the L1 layer corresponding to the recording area of the L0 layer in which the data is already recorded. Explaining it more specifically, it is assumed that the data is recorded in the data recording area 105a from an N1 track to an N2 track in the L0 layer. It is also assumed that the eccentricity of the optical disc 100 is α. At this time, in the L1 layer, under the control of the CPU 354, the data is recorded into the recording area from an N1+α track to an N2−α track. Namely, the data is recorded into a data recording area 115a, which is the recording area shown as (2) in FIG. 3.

The following is the reason to adopt a margin (i.e. one specific example of the "edge portion" of the present invention) of a size corresponding to the size of the eccentricity α. Namely, if the eccentricity occurs between the L0 layer and the L1 layer, the recording areas having the same track number of the both recording layers do not always correspond to each other, as viewed from the optical pickup 352. Therefore, if data is to be recorded onto another track of the L1 layer having the same track number of as that of one track of the L0 layer in which the data is already recorded, the laser light is not always irradiated through the one track. Therefore, such a situation can be prevented, by adopting the margin of the size corresponding to the extent of the eccentricity α. In short, it can be said that this is one specific method for more certainly ensuring the condition that the data is recorded in the recording area of the L1 layer corresponding to the L0 layer in which the data is already recorded.

As described above, if data is recorded into the L1 layer by adopting the margin by the size of the eccentricity α, it is possible to properly record the data into the L1 layer corresponding to the L0 layer in which the data is already recorded.

With regard to the size of the eccentricity α, specifically, it may be detected by the operation of the eccentricity detector 359. Moreover, without depending on the operation of the eccentricity detector 359, an allowable maximum eccentric amount may be regarded as the eccentricity α. For example, in a DVD as one specific example of the optical disc 100, the allowable maximum eccentric amount is defined to 70 μm at most, according to the standard. Therefore, it may constructed such that the data is recorded into the recording area of the L1 layer set as α=70 μm. Alternatively, a size corresponding to the predetermined margin may be added to the eccentric amount. For example, if layer jump is performed from the L0 layer to the L1 layer, it is not always possible to jump to the corresponding position, depending on the accuracy of the spindle motor 351 or the like. Therefore, an accuracy error caused by the layer jump may be regarded as the margin.

After that, if data is recorded into the L0 layer again, the data is recorded following the previously recorded data (i.e. the data recorded in the data recording area 105a). Specifically, the data is recorded into a data recording area 105b from an N2 track to an N3 track.

Then, if data is recorded into the L1 layer, the data is recorded into a data recording area 115 following the previously recorded data (i.e. the data recorded in the data recording area 115a). At this time, it is necessary to ensure the margin corresponding to the eccentricity α, on the outer circumferential side of the data recording area 115. On the other hand, on the inner circumferential side, the data is recorded in the data recording areas 105a and 105b in the L0 layer, so that it is possible to record data following the data recording area 115a, continuously. Specifically, the data is recorded into a data recording area 115b from an N2−α track to an N3−α track.

Then, in the end, predetermined control information or the like for controlling the recording or reproduction of the data is recorded into the lead-in areas 102 and 112, and the lead-out areas 108 and 118. Even in this case, after the control information or the like is recorded into the lead-in area 102 of the L0 layer, the control information or the like is recorded into the lead-in area 112 of the L1 layer corresponding to the L0 layer in which the control information or the like is already recorded. Moreover, after the control information or the like is recorded into the lead-out area 108 of the L0 layer, the control information or the like is recorded into the lead-out area 118 of the L1 layer corresponding to the L0 layer in which the control information or the like is already recorded.

Incidentally, in the case of the optical disc on which the control information or the like is recorded in advance in the lead-in area 102 (particularly, near the boundary between the lead-in area 102 and the data recording area 105a), it may be constructed such that the data is recorded from an N1 track, without considering the eccentricity α, in the data recording area 115a of the L1 layer. In the case of the optical disc on which the control information or the like is recorded in advance in the lead-out area 108 (particularly, near the boundary between the lead-out area 108 and the data recording area 105b), it may be constructed such that the data is recorded up to an N1 track, without considering the eccentricity α, in the data recording area 115b of the L1 layer.

Now, with reference to FIG. 4 and FIG. 5, a more detailed explanation will be given for the eccentricity of the optical disc 100 and the data recording aspect in the case where there is the eccentricity. FIG. 4 is a plan view conceptually showing an aspect of the eccentricity of the optical disc 100. FIG. 5 are plan views conceptually showing aspects in which data is recorded onto the optical disc 100, by the information recording apparatus 300 in the embodiment.

As shown in FIG. 4, if there is the eccentricity caused by the bonding error on the optical disc 100, the track N of the L0 layer and the track N of the L1 layer are formed with their centers shifted by the size corresponding to the eccentricity α. The positions of the L0 layer and the L1 layer having the same physical address, are shifted by a size corresponding to any value (0 to the eccentricity α). For example, as shown in FIG. 4, the recording area with a physical address value of A in the L0 layer (i.e. a position shown by a black circle in FIG. 4) and the recording area with a physical address value of A in the L1 layer (i.e. a position shown by a white circle in FIG. 4) are formed with them shifted by the size corresponding to the eccentricity α.

Moreover, if there is no eccentricity, the track N of the L0 layer and the track N of the L1 layer are located in the same position, viewed from the optical pickup 352 (or the laser light irradiated from the optical pickup 352), except for the position in the depth direction. Moreover, if there is no eccentricity, the positions of the L0 layer and the L1 layer having the same physical address, are located in the same position, viewed from the optical pickup 352 (or the laser light irradiated from the optical pickup 352).

When there is the eccentricity as described above, as shown in FIG. 5(a), it is assumed that the data is recorded up to the N track recording area from the inner circumferential side in the L0 layer. In the L1 layer, the data is recorded up to the N−α track recording area from the inner circumferential side. Namely, the data is recorded into the recording area shown by the hatching in FIG. 5(a). At this time, the recording area shown by the hatching does not cross over the N track of the L0 layer.

Moreover, as shown in FIG. 5(b), if the data is recorded on the outer circumferential side from the N track in the L0 layer (i.e. if the data is not recorded on the inner circumferential side of the N track), the data is recorded on the outer circumferential side from the N+α track in the L1 layer. Namely, the data is recorded into the recording area shown by the hatching in FIG. 5(b). Even at this time, the recording area shown by the hatching does not cross over the N track of the L0 layer.

By recording the data into the L1 layer in this manner, since the data is always recorded in the L0 layer corresponding to the recording area shown by the hatching, it is possible to record the data into the L1 layer by using the laser light irradiated through the L0 layer in which the data is already recorded.

In general, in the dual-layer type optical disc, it is known that the data quality recorded in the L1 layer varies between the case where the data is recorded into the L1 layer by using the laser light irradiated through the L0 layer in which the data is already recorded and the case where the data is recorded into the L1 layer by using the laser light irradiated through the L0 layer in which the data is unrecorded. Namely, there is such a technical problem that in both the two cases, if the data is recorded by using the laser light irradiated in the same condition, even if good recording features can be obtained in one condition, the good recording features cannot be always obtained in the other condition.

However, according to the information recording apparatus 300 in the embodiment, it is possible to record the data into the L1 layer by using the laser light irradiated through the L0 layer in which the data is already recorded. Thus, it is possible to solve the above-mentioned technical problem. As a result, it is possible to perform the proper recording into any recording area of the L1 layer, with an optimum recording laser power in the case where the data is recorded into the L1 layer through the L0 layer in which the data is already recorded. In particular, it is unnecessary to particularly change the recording laser power and it is only necessary to record the data in accordance with the track number, so that there is such an advantage that the recording operation itself is simplified. In addition, even if the recorded data is reproduced, it is possible to obtain good reproduction features (e.g. an asymmetry value, a jitter value, degree of modulation, a reproduction error rate, etc.).

Of course, even if the data is not recorded onto the N−α or less track (or the N+α or more track) of the L1 layer, as long as it is constructed to record the data into the L1 layer corresponding to the L0 layer in which the data is already recorded, the data may be also recorded onto the N−α or more track (or the N+α or less track). In other words, as long as the data can be recorded into the L1 layer by using the laser light irradiated through the L0 layer in which the data is already recorded, the data may be recorded, regardless of the track number, as described above. However, as described above, if the data is recorded on the basis of the track number and the eccentricity α, there is such a great advantage that the recording operation can be simplified or accelerated.

Incidentally, as described in FIG. 1, the pre-record data 120, indicating the recordable recording area in the L1 layer (e.g. the recording area from the N1+α track to the N2−α track in FIG. 3), may be recorded onto the optical disc 100. At this time, the information recording apparatus 300 may be constructed to record the data into the L1 layer with reference to the pre-record data 120. In particular, if the recording area for generating the lead-in area 102 is determined in advance, it is possible to specify the position of at least one of the edge portions of the recordable recording area in the L1 layer (i.e. the N1+α track). Moreover, even if the recording area for generating the lead-out area 108 is determined in advance, it is also possible to specify the position of at least one of the edge portions of the recordable recording area in the L1 layer. Therefore, there is such an advantage that the data can be recorded into the L1 layer, relatively easily, with reference to the pre-record data 120 recorded in advance, as described above.

The pre-record data 120 may include address information indicating an address of the recording area in which the data can be recorded in the L1 layer, for example. Alternatively, in contrast, the pre-record data 120 may include address information indicating an address of the recording area in which the data cannot be recorded in the L1 layer. Alternatively, if the control information or the like is pre-recorded into the lead-out area 108 (118), or if the control information or the like is pre-recorded into the lead-in area 102 (112), the recording area cannot be used as the data recording area 105 (115). In other words, it may be constructed to indirectly indicate the recordable or unrecordable recording area in the L1 layer, by recording in advance the data into the lead-in area 102 of the L1 layer or the like. Therefore, even various data indirectly indicating the recordable position (i.e. the various control information or the like recorded in advance in the lead-in area and the lead-out area) is also one specific example of the pre-record data 120. Moreover, the same is true for a middle area, a border-in area, and a border-out area, described later.

Moreover, the pre-record data 120 may be recorded in the memory 355 or the like of the information recording apparatus 300, or the pre-record data 120 may be obtained through a wired or wireless network or the like.

Now, the boundary of the data will be explained with reference to FIG. 6 and FIG. 7. Namely, an explanation will be given for the recording aspect of the data on the boundary of the data recording area 105a and the data recording area 105b in FIG. 3, for example. FIG. 6 and FIG. 7 are data structure diagrams conceptually showing the recording aspect of the data on the boundary of the areas.

After the data is recorded from the inner circumferential side, if the data is written once or additionally recorded on the outer circumferential side, link data as shown in FIG. 6 is recorded. This is a data link method used in the case where the data is recorded into the data recording area 105b, which is on the further outer circumferential side of the data recording area 105a, after the data is recorded into the data recording area 105a, for example.

Specifically, an explanation will be given for the case where the data is additionally recorded into the data recording area 105b from the data recording area 105a. As shown in FIG. 6, it is assumed that the data is recorded in the last recording area of the data recording area 105a. At this time, the data is recorded by the ECC block unit, so that padding is performed on predetermined data (e.g. "01b" data, etc.) in the recording area in which the data is not recorded. Then, the data corresponding to a data amount of 16 bytes is recorded from the head address of a first synchronization frame (first sync frame) included in a next ECC block. The position in which the data is recorded is a linking position. The linking position indicates the position that the additional recording of the data is actually performed (i.e. the recording of the data is restarted). Then, the recording of the data necessary for the additional recording of the data is ended, and the recording operation is once ended. Namely, the recording is once ended in the position of End of Recording, in FIG. 6.

Then, if the data is additionally recorded, it starts following the linking position of the first sync frame. Specifically, the data is additionally recorded from the recording area corresponding to the 15th to 17th byte from the head address of the first sync frame. At this time, in order to link the data, predetermined data (e.g. "01b" data, etc.) is recorded following the linking position. The data link method of recording the predetermined data by 2 KB is referred to as 2 KB link, and the data link method of recording the predetermined data by 32 KB is referred to as 32 KB link. Then, between the recording position of the data recorded in the end before the additional recording and the position that the predetermined data is recorded, is referred to as a linking loss area. Following the linking loss area, desired data (e.g. various content data, etc.) to be originally recorded into the data recording area 105b is recorded.

Moreover, if the data is additionally recorded on the further inner circumferential side of the recording area in which the data is already recorded, link data as shown in FIG. 7 is recorded. This is a data link method used in the case where the control information or the like is recorded into the lead-in area 102, which is on the further inner circumferential side of the data recording area 105a, after the data is recorded into the data recording area 105a, for example.

Specifically, an explanation will be given for the case where the data is additionally recorded into the lead-in area 102 from the data recording area 105a. As shown in FIG. 7, if the data is recorded into the data recording area 105a, one portion of the linking loss area is generated in advance. Namely, the linking loss area is provided in the head portion of the data to be originally recorded into the data recording area 105a, and "01b" data or the like is recorded there. The data is recorded up to just before the above-mentioned linking position (i.e. from the head address to the 18th byte of the first sync frame). Then, the recording of the data necessary for the additional recording of the data is ended, and after the various data necessary for the data recording area 105a is recorded, the recording operation is once ended.

Then, if the data is additionally recorded into the lead-in area 102, the linking position or the like is generated, in addition to the various control information or the like, which is originally recorded into the lead-in area 102. Namely, as described above, the linking position is generated in the recording area from the 15th to the 17th bytes of the first sync frame, and after that, the various control information or the like is recorded into the lead-in area 102 so as to be connected to the linking position.

Moreover, as shown in FIG. 8 to FIG. 10, the above-mentioned recording operation can be adopted even in the case where a border zone is provided to thereby additionally record the data. The three aspects of the recording in this case will be explained with reference to FIG. 8 to FIG. 10. Each of FIG. 8 to FIG. 10 is a data structure diagram conceptually showing the data structure of the optical disc in such a recording aspect that the data is additionally recorded or written once by using the border zone.

As shown in FIG. 8, the L0 layer is provided with: the lead-in area 102; and the lead-out area 108, and the L1 layer is provided with: the lead-in area 112; and the lead-out area 118. Particularly on an optical disc 100a, there are a plurality of block areas in the data recording area 105 (115) of the L0 layer (L1 layer). Then, various content data, such as movie data and audio data, for example, and various other data or the like are recorded by a unit of this block area. Namely, for example, certain movie data is recorded in a block area A, certain music data is recorded into a block area B, and certain PC data is recorded into a block area C.

This block area will be explained, more specifically. Each block area is provided with: a border-in area 104; a data recording area 105 (115); a layer buffer area 106 (116); and a border-out area 117. However, in the block area A corresponding to the first block area viewed from the lead-in area 102, a file system 103 functions as management information, so that the border-in area 104 is not provided. Namely, the block area A includes: data recording areas 105a and 115a; layer buffer areas 106a and 116a; and a border-out area 117a. The block area B includes: a border-in area 104b; data recording areas 105b and 115b; layer buffer areas 106b and 116b; and a border-out area 117b. The block area C includes: a border-in area 104c; data recoding areas 105c and 115c; layer buffer areas 106c and 116c; and a border-out area 117c.

However, if the area into which the file system 103 is recorded is regarded as the border-in area 104 (114), it can be said that the block area A is not different from the other block areas B and C.

The border-in area 104 is an area to record therein the management information for managing the data recorded in each block area (e.g. updated physical format information, described later). The border-in area 104 will be explained in detail later (refer to FIG. 11).

The layer buffer area 106 (116) is an area provided in the L0 layer (L1 layer) in a position in which the target recording layer into which the data is recorded is changed from the L0 layer to the L1 layer. Specifically, in the layer buffer area 106 (116), the actual content data or the like is not recorded, but "00h" data is recorded. The layer buffer area 106 (116) preferably occupies a size of about 0.5 mm in the radial direction in the first block area A, and occupies a size of about 0.1 mm in the subsequent block areas (e.g. the block areas B and C). However, it is not limited to this size, and it is only necessary to have a size large enough to prevent the penetration of the optical pickup 352.

Incidentally, the "penetration of the optical pickup" herein indicates that if the block area A is only provided for the optical disc 100, in searching the data recording area 105a, the search target jumps across the data recording area 105a to an area in which the data is unrecorded (e.g. a mirror area), for example.

The border-out area 117 is an area to record therein the various control information for controlling the recording operation when the data is recorded into each block area and the reproduction operation when the data recorded is reproduced. The border-out area 117 will be described in detail later (refer to FIG. 11).

Particularly in the embodiment, the data recording area 115 (a to c) of the L1 layer is smaller than the corresponding data recording area 105 (a to c) of the L1 layer, by the size corresponding to the eccentricity α from each of the edges. For example, with regard to the data recording area 105a, if the data is recorded in the recording area from the N1 track to the N2 track, the data is recorded into the N1+α track to the N2−α track, as the data recording area 115a.

However, if it is constructed such that the data is recorded into the file system 103, the border-in area 104, the layer buffer area 105, or near the boundary between them and particularly the data recording area 105a before the data is recorded into the L1 layer, it is not always necessary to provide the margin corresponding to the size of the eccentricity α. For example, if it is constructed such that the "00h" data is recorded into the buffer layer area 106a before the data is recorded into the data recording area 115a, the data may be recorded up to the N2 track, as the data recording area 115a.

Incidentally, as the order of recording the data onto the optical disc 100a shown in FIG. 8, firstly, the desired data is recorded into the data recording area 105 of the L0 layer, and then, the "00h" data is recorded into the layer buffer area 106 of the L0 layer, for example. Then, the desired data is recorded into the data recording area 115 of the L1 layer, and then, the various data described later is recorded into the border-out area 117 of the L1 layer. Then, the data is recorded into the lead-in area 102 and the file system 103 (or the border-in area 104) of the L0 layer, and the data is recorded into the lead-in area 112 of the L1 layer, and the "00h" data is recorded into the layer buffer area 116 of the L1 layer in the end.

Incidentally, if it is not constructed to record the desired content data or the like into the layer buffer area 116; namely, if it is constructed such that it is unnecessary to read the data to be recorded into the layer buffer area 116, the layer buffer area 116 may not be constructed such that the data is recorded thereto by using the laser light LB irradiated through the L0 layer in which the data is already recorded.

Moreover, as shown in FIG. 9, the L0 layer may be provided with the border-in area 104 and a border-out area 107, and the L1 layer may be provided with the layer buffer area 116. In this case, as the order of recording the data onto an optical disc 100b shown in FIG. 9, firstly, the desired data is recorded into the data recording area 105 of the L0 layer, and then, the desired data is recorded into the data recording area 115 of the L1 layer. Then, the various data described later is recorded into the border-out area 107 of the L0 layer. Then, the data is recorded into the lead-in area 102 and the file system 103 (or the border-in area 104) of the L0 layer, and the "00h" data is recorded into the layer buffer area 116 of the L1 layer in the end in a form of sandwiching in the both edges of the data recording area 115 therebetween. Incidentally, in the optical disc 100b, the border-out area 107 or the like of the L0 layer also functions as the so-called layer buffer area 106 (116).

Moreover, as shown in FIG. 10, two border-in areas 104 and two border-out areas 117 may be provided for each block (i.e. one for the L0 layer and one for the L1 layer) to thereby function as the layer buffer area 106 (116). In this case, as the order of recording the data onto an optical disc 100c shown in FIG. 10, firstly, the desired data is recorded into the data recording area 105 of the L0 layer, and then, the data is recorded into the lead-in area 102 and the file system 103 (or the border-in area 104) of the L0 layer. Then, the various data described later is recorded into a border-out area 107a of the L0 layer. Then, the desired data is recorded into the data recording area 115a of the L1 layer, and then, the various data described later is recorded into the border-out area 107a of the L1 layer. Then, the data is recorded into the lead-in area 112 (or the border-in area 114) of the L1 layer, and then, the various data described later is recorded into the border-out area 117 of the L1 layer. Incidentally, in the optical disc 100c, the border-out area 107 or the like of the L0 layer also functions as the so-called layer buffer area 106 (116).

Incidentally, in the optical disc 100 explained in FIG. 8 to FIG. 10, it is obvious that the size of each area is not necessarily at a ratio shown in the drawings. For example, the layer buffer area 106 (116) is preferably about 70 μm from the inner circumference to the outer circumference of the optical disc 100, or may have another size. Moreover, the border-out area 107 (117) is preferably about 500 to 100 μm from the inner circumference to the outer circumference of the optical disc 100, or may have another size. Moreover, the border-in area 104 (114) is preferably about several μm from the inner circumference to the outer circumference of the optical disc 100, or may have another size.

Moreover, the present invention is not limited to the recording aspects explained in FIG. 8 to FIG. 10. In short, if the data can be recorded into the L1 layer by using the laser light irradiated through the L0 layer in which the data is already recorded, that is included in the scope of the present invention.

Next, a detailed explanation will be given for the data structures of the border-in area and the border-out area of the optical disc in the embodiment, with reference to FIG. 11. FIG. 11 is a diagram explaining in more detail the data structures of the border-in area and the border-out area, generated by the information recording apparatus in the embodiment.

As shown in FIG. 11, on the basis of a predetermined data recording area 105b (115b), the border-in area 104b of the block area including the data recording area 105b (115b) (i.e. the block area B in FIG. 2) and the border-out area 117a of the block area, located one before the above-mentioned block area (i.e. the block area A), make a pair, to thereby form one border zone.

In the border-in area 104b, updated physical format information is recorded. The updated physical format information is recorded in the lead-in area 102, and it indicates data distribution information (e.g. mapping information, etc.) in the data recording area 105 (115). Then, the updated physical format information has a size corresponding to 5ECC blocks. However, it is not limited to this size.

The border-out area 117a has a first border-out area 117a-1 and a second border-out area 117a-2, each having the same size. In the first border-out area 117a-1, RMD copy and stop block are recorded.

The RMD copy is information for controlling the data recording, and it includes the same information as RMD (Recording Management Data) recorded in the lead-in area 102. The RMD copy can provide information (i.e. RMD) for reproducing the various data recorded in the block area, for a DVD-ROM only drive which cannot read the ROM area in the lead-in area 102 of a DVD-R, for example.

The stop block includes flag information having a size of 2ECC blocks, and it indicates whether or not the data is recorded after the border-out area 117a. Namely, if judging from the stop block that the data is not recorded, an information reproducing apparatus for reproducing the data recorded on the optical disc 100 does not read information in the subsequent area.

In the border-out area 117a-2, next border marker is recorded. For example, by recording three of the data with a size of 2ECC blocks, the next border marker is indicated. Then, the next border marker is information used by the information recording apparatus for recording the data onto the optical disc 100. Specifically, if the data is further recorded following the border-out area 117a, predetermined data (e.g. "00h") is recorded as the next border marker. On the other hand, if the data is not recorded following the border-out area 117a, the border-out area 117a-2 is in a mirror condition (i.e. unrecorded condition).

As explained above, according to the embodiment of the information recording apparatus in the present invention, when the data is recorded into the L1 layer, it is possible to irradiate the laser light through the L0 layer in which the data is already recorded. In other words, it is possible to record the data into the L1 layer by using the laser light irradiated through the L0 layer in which the data is already recorded. Thus, it is possible to perform the proper recording in any recording area of the L1 layer, with the optimum recording laser power in the case where the data is recorded into the L1 layer through the L0 layer in which the data is already recorded. Therefore, there is such a great advantage that it is possible to obtain good recording features throughout the entire or almost the entire surface of the optical disc.

(3) Second Operation Example

Next, with reference to FIG. 12 to FIG. 14, the second aspect of the recording operation performed by the information recording apparatus 300 in the embodiment will be explained. FIG. 12 is a data structure diagram conceptually showing the aspect in which data is recorded onto the optical disc 100, by the information recording apparatus 300 in the embodiment. Incidentally, in the second operation example, an explanation will be given for the aspect of recording the data on the optical disc of an opposite track path type.

As shown in FIG. 12, firstly, data is recorded into a certain recording area of the L0 layer, by the operation of the information recording apparatus 300 in the embodiment. Namely, the data is recorded into a data recording area 105a, which is the recording area shown as (1) in FIG. 12.

After that, if data is recorded into the L1 layer, the data is recorded into the recording area of the L1 layer corresponding to the recording area of the L0 layer in which the data is already recorded, as in the above-mentioned first operation example. Explaining it more specifically, it is assumed that the data is recorded in the data recording area 105a from an N1 track to an N2 track in the L0 layer. It is also assumed that the eccentricity of the optical disc 100 is α. At this time, in the L1 layer, under the control of the CPU 354, the data is recorded into the recording area from an N1+α track to an N2−α track, from the outer to the inner circumferential side.

After that, if data is recorded into the L0 layer again, the data is recorded following the data recorded in the data recording area 105*a*. Specifically, the data is recorded into a data recording area 105*b* from an N2 track to an N3 track.

Then, if data is recorded into the L1 layer, the data is recorded following the data recorded in the data recording area 115*a*. Specifically, the data is recorded into a data recording area 115*b* from an N2−α track to an N3−α track, from the outer to the inner circumferential side.

Then, in the end, predetermined control information or the like for controlling the recording or reproduction of the data is recorded into the lead-in area 102, the lead-out areas 118, and the middle areas 109 and 119. Even in this case, after the control information or the like is recorded into the lead-in area 102 of the L0 layer, the control information or the like is recorded into the lead-out area 118 of the L1 layer corresponding to the L0 layer in which the control information or the like is already recorded. Moreover, after the control information or the like is recorded into the middle area 109 of the L0 layer, the control information or the like is recorded into the middle area 119 of the L1 layer corresponding to the L0 layer in which the control information or the like is already recorded.

As described above, even in an optical disc 100*d* of an opposite track path type, as in the above-mentioned optical disc 100 of a parallel track path type, it is possible to record the data into the L1 layer by using the laser light irradiated through the L0 layer in which the data is already recorded. Therefore, even in the second operation example, it is also possible to receive the various benefits owned by the above-mentioned first operation example.

Moreover, even in the optical disc of an opposite track path type, if the border zone is provided to write once the data, the above-mentioned recording operation can be adopted. The recording aspect in this case will be explained with reference to FIG. 13 and FIG. 14. Each of FIG. 13 and FIG. 14 is a data structure diagram conceptually showing the data structure of the optical disc in such an aspect that the data is written once by using the border zone.

As shown in FIG. 13, the L0 layer is provided with the lead-in area 102 and the middle area 109, and the L1 layer is provided with the lead-out area 118 and the middle area 119. Particularly in the optical disc 100*c*, there are a plurality of block areas in the data recording area 105 (115) of each of the L0 layer and the L1 layer.

Even in an optical disc 100*e* provided with a plurality of block areas, as in the above-mentioned first operation example, the data is recorded into the L1 layer in view of the eccentricity α. By this, it is possible to receive the above-mentioned various benefits of the first operation example.

Moreover, as shown in FIG. 14, it may be constructed such that the layer buffer area 106*a* (*b, c*) of the L0 layer and the layer buffer area 116*a* (*b, c*) of the L1 layer are shifted on the end edge, by the size corresponding to the eccentricity α. By virtue of such construction, even in recording the information into the layer buffer area 116*a* (*b, c*) of the L1 layer, it is always possible to irradiate the laser light LB through the L0 layer in which the data is already recorded. Therefore, as compared to the structure in FIG. 13, it is possible to reduce the size of the layer buffer area 116*a* (*b, c*) of the L1 layer, and it is possible to effectively use the data recording area 115*a* (*b, c*) of the L1 layer, which increases along with the above-mentioned reduction.

Incidentally, in the above-mentioned embodiments, the dual-layer type optical disc 100 is explained as a specific example: however, it is not limited to the dual-layer type optical disc. Even a multilayer type optical disc having three or more recording layers can receive the above-mentioned various benefits if adopting the same structure.

Moreover, in the above-mentioned embodiments, the optical disc 100 is explained as one example of the information recording medium, and the recorder related to the optical disc 100 is explained as one example of the information recording apparatus. The present invention, however, is not limited to the optical disc and the recorder thereof, and can be applied to various information recording medium which can support other high-density recording or high transfer rate, and the recorder thereof.

The present invention is not limited to the above-described embodiments, and various changes may be made, if desired, without departing from the essence or spirit of the invention which can be read from the claims and the entire specification. An information recording medium, an information recording apparatus, an information recording method, and a computer program for recording control, which involve such changes, are also intended to be within the technical scope of the present invention.

INDUSTRIAL APPLICABILITY

The information recording medium, the information recording apparatus and method, and the computer program of the present invention can be applied to an information recording medium, such as a DVD, and information recording apparatus and an information recording method, such as a DVD recorder. Moreover, they can be applied to an information recording apparatus or the like, which is mounted on or can be connected to various computer equipment for consumer use or business use, for example.

The invention claimed is:

1. An information recording apparatus for recording record information onto an information recording medium comprising a first recording layer and a second recording layer to record therein the record information by irradiating laser light in an order from an irradiation side of the laser light, said information recording apparatus comprising:

a recording device for recording the record information into at least one of the first recording layer and the second recording layer by irradiating the laser light;

a first controlling device to control said recording device to record the record information into an area portion of an N1 track to an N2 track (wherein, N1<N2) on the first recording layer;

a second controlling device to control, after the control by the first controlling device, said recording device to record the record information into an area portion of an N1+α track to an N2−α track on the second recording layer, wherein α indicates a margin which includes an eccentricity indicating a shift between the first recording layer and the second recording layer;

a third controlling device to control, after the control by the second controlling device, said recording device to record the record information into an area portion of an N2 track to an N3 track (wherein, N2<N3) on the first recording layer; and a fourth controlling device to control, after the control by the third controlling device, said recording device to record the record information into an area portion of an N2−α track to an N3+α track on the second recording layer.

2. The information recording apparatus according to claim 1, further comprising an eccentricity detecting device for detecting the eccentricity; and
    a calculating device to calculate the margin on the basis of a size of the detected eccentricity.

3. An information recording method in an information recording apparatus comprising a recording device capable of recording record information onto an information recording medium comprising a first recording layer and a second recording layer to record therein the record information by irradiating laser light in an order from an irradiation side of the laser light, said information recording method comprising:
    a recording process of recording the record information into at least one of the first recording layer and the second recording layer by irradiating the laser light;
    a first controlling process of control said recording device to record the record information into an area portion of an N1 track to an N2 track (wherein, N1<N2) on the first recording layer;
    a second controlling process of control, after the control by the first controlling process, said recording device to record the record information into an area portion of an N1+α track to an N2−α track on the second recording layer, wherein α indicates a margin which includes an eccentricity indicating a shift between the first recording layer and the second recording layer;
    a third controlling process of control, after the control by the second controlling process, said recording device to record the record information into an area portion of an N2 track to an N3 track (wherein, N2<N3) on the first recording layer; and
    a fourth controlling process of control, after the control by the third controlling process, said recording device to record the record information into an area portion of an N2−α track to an N3+α track on the second recording layer.

4. The information recording method according to claim 3, further comprising an eccentricity detecting process of detecting the eccentricity; and
    a calculating process of calculate the margin on the basis of a size of the detected eccentricity.

\* \* \* \* \*

UNITED STATES PATENT AND TRADEMARK OFFICE
CERTIFICATE OF CORRECTION

PATENT NO. : 7,706,241 B2  Page 1 of 1
APPLICATION NO. : 11/628757
DATED : April 27, 2010
INVENTOR(S) : Kazuo Kuroda et al.

It is certified that error appears in the above-identified patent and that said Letters Patent is hereby corrected as shown below:

On column 22, line 66:

"N2– α track to an N3+ α track on the second recording"

should be replaced with:

--N2– α track to an N3- α track on the second recording--

On column 24, line 14:

"N2– α track to an N3+ α track on the second recording"

should be replaced with:

--N2– α track to an N3- α track on the second recording--

Signed and Sealed this
Twenty-fourth Day of May, 2011

David J. Kappos
*Director of the United States Patent and Trademark Office*